United States Patent
Nigam et al.

(10) Patent No.: US 11,380,066 B2
(45) Date of Patent: Jul. 5, 2022

(54) CONTENT CREATION IN AUGMENTED REALITY ENVIRONMENT

(71) Applicant: Samsung Electronics Co., Ltd., Suwon-si (KR)

(72) Inventors: Varun Nigam, Noida (IN); Veenu Pandey, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/998,923

(22) Filed: Aug. 20, 2020

(65) Prior Publication Data
US 2021/0056761 A1    Feb. 25, 2021

(30) Foreign Application Priority Data

Aug. 22, 2019 (IN) .............................. 201911033920

(51) Int. Cl.
| G06T 19/00 | (2011.01) |
| G06F 21/44 | (2013.01) |
| G06F 3/04815 | (2022.01) |
| G06F 3/0354 | (2013.01) |

(52) U.S. Cl.
CPC ........ *G06T 19/006* (2013.01); *G06F 3/03545* (2013.01); *G06F 3/04815* (2013.01); *G06F 21/44* (2013.01)

(58) Field of Classification Search
None
See application file for complete search history.

(56) References Cited

U.S. PATENT DOCUMENTS

| 8,638,989 | B2 | 1/2014 | Holz |
| 8,823,855 | B2 | 9/2014 | Hwang |
| 9,330,478 | B2 | 5/2016 | Anderson |
| 9,582,187 | B2 | 2/2017 | Gil et al. |
| 10,223,831 | B2 | 3/2019 | Fateh |
| 2011/0164000 | A1 | 7/2011 | Pance |
| 2012/0113223 | A1 | 5/2012 | Hilliges et al. |
| 2018/0188830 | A1 | 7/2018 | Kim et al. |
| 2018/0232056 | A1* | 8/2018 | Nigam .................. G06F 3/013 |
| 2018/0330548 | A1* | 11/2018 | Cabanier ................ G06F 3/14 |
| 2020/0042157 | A1* | 2/2020 | Robinson ............. G06F 1/1632 |

FOREIGN PATENT DOCUMENTS

KR    10-2016-0072306 A    6/2016

OTHER PUBLICATIONS

International Search Report of the International Searching Authority dated Nov. 17, 2020 in connection with International Application No. PCT/KR2020/010798, 3 pages.

* cited by examiner

Primary Examiner — Yi Wang

(57) ABSTRACT

Systems and methods for creating content in augmented reality (AR) environment. The content is created by a combination of at least a handheld device and an AR device, and involves initiation and establishment of a session between the handheld device and the AR device, command and data generation at the handheld device, transmission of the command and data from the handheld device to the AR device, processing of the command and data at the AR device to build context from the command and/or data and to create content from the context, saving and sharing of the created content, retrieval of the created content, and optionally modification of the retrieved content.

20 Claims, 23 Drawing Sheets

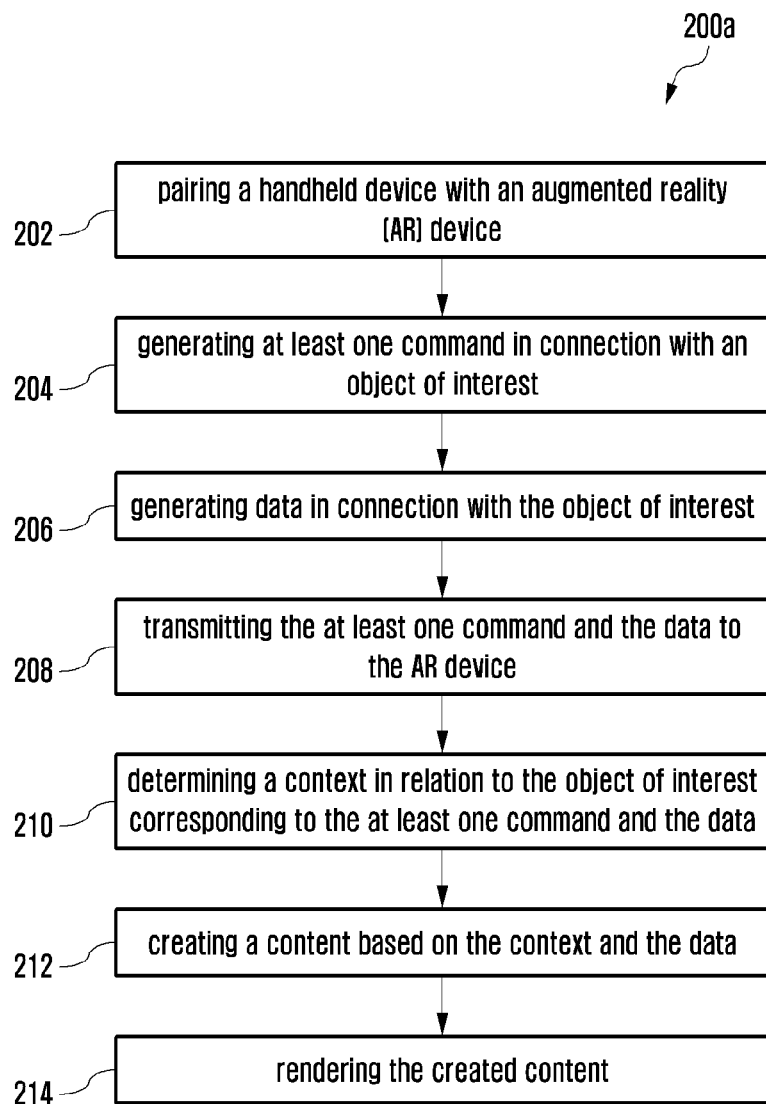

FIG. 12A
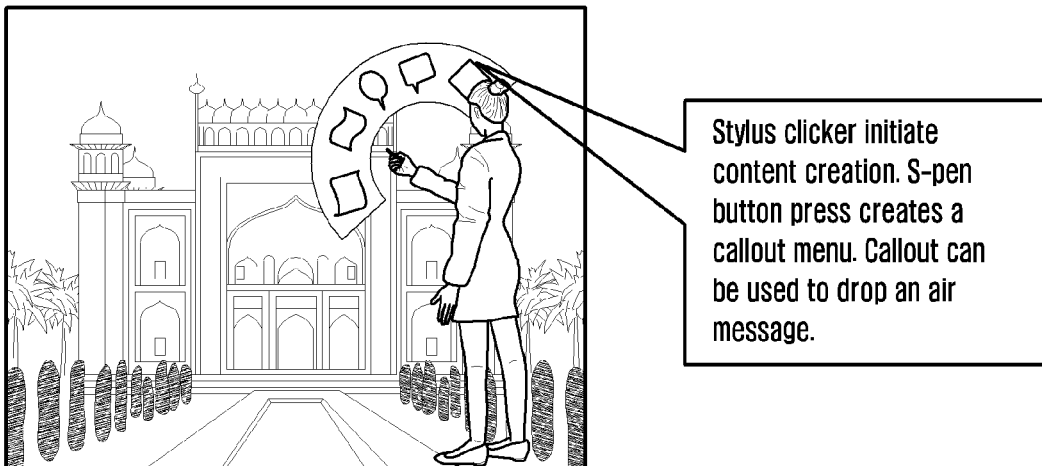
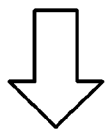
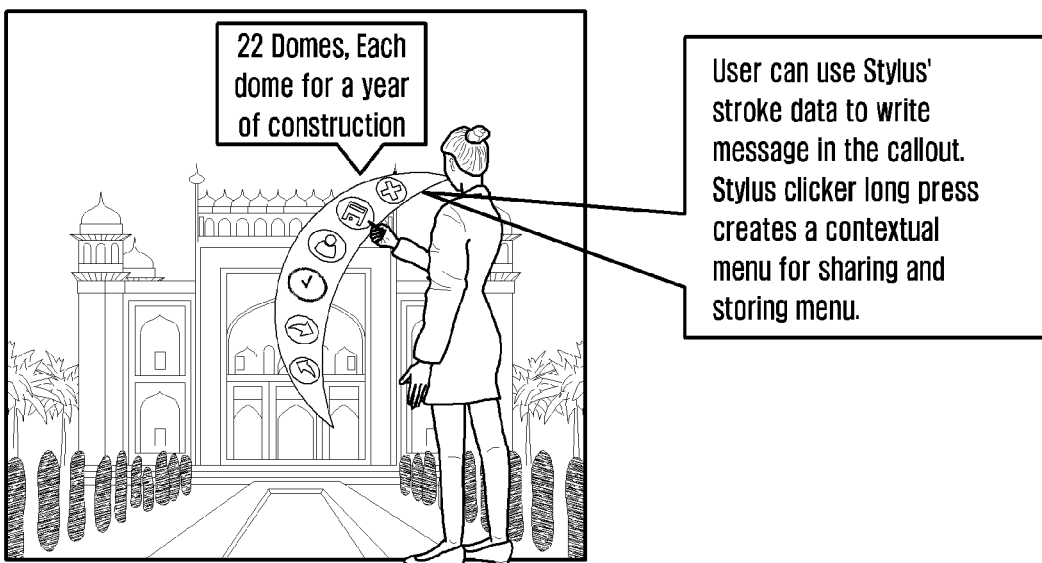

FIG. 13

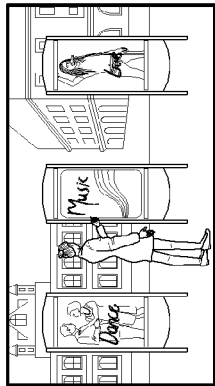

User initiates the system with Stylus Click. User then makes a selection using Stylus button press action with stroke movement

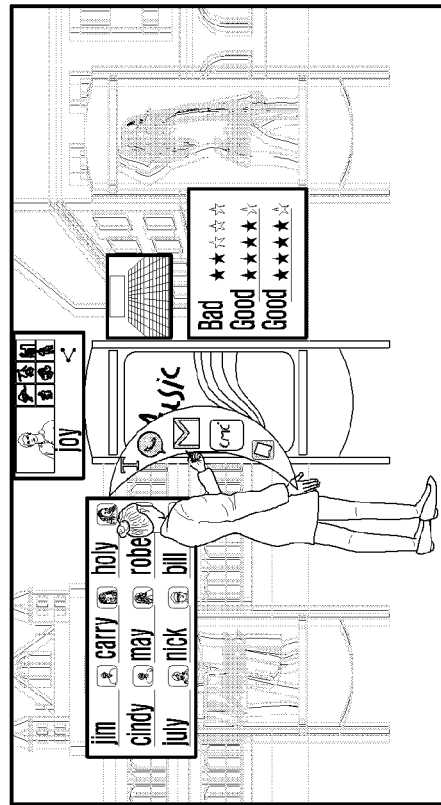

Stylus long button press action process the selected content, gathers additional information and generate contextual menu

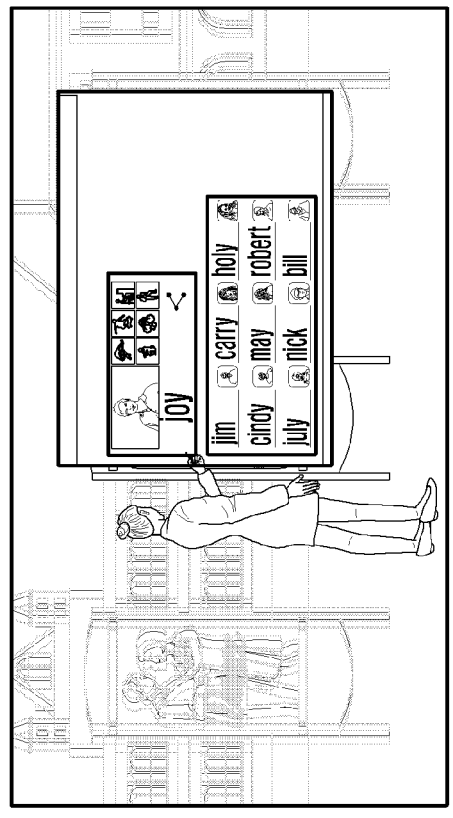

User select an option from the menu and provided Stylus stroke data for creating content along with pick and drop relevant information FIG. 16A
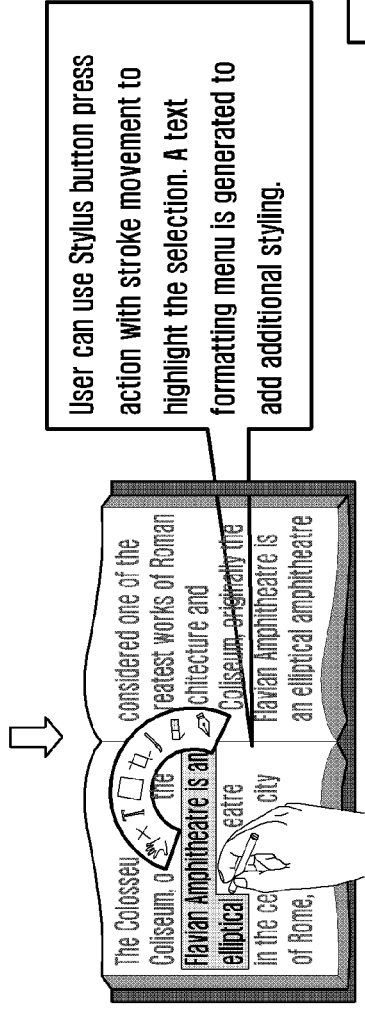
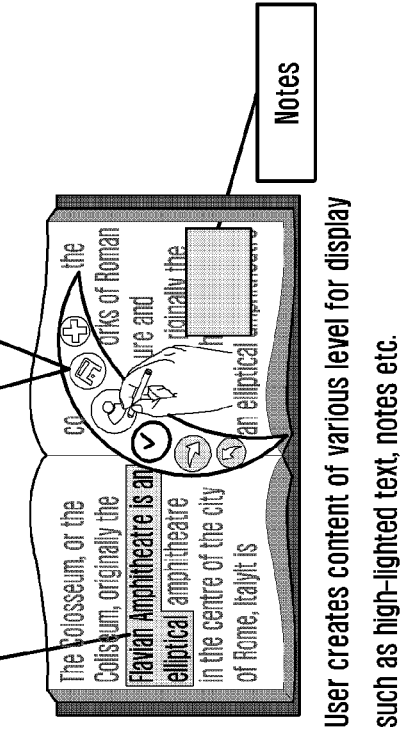

FIG. 16B
Content Retrieval
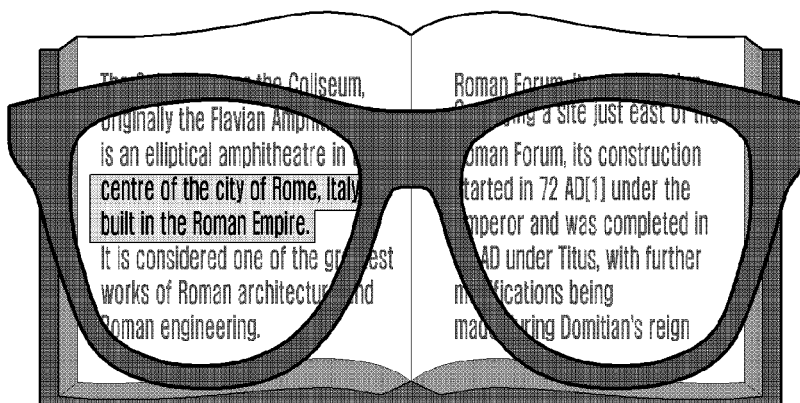
USER #1 : Content sharing level at highlight
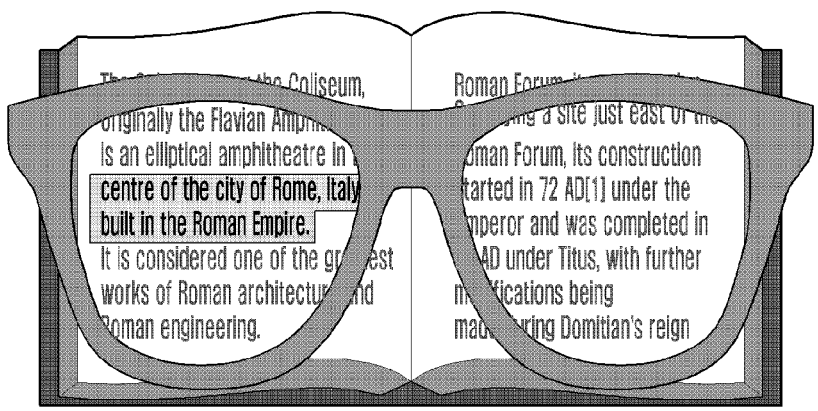
USER #2 : Full Content sharing

CONTENT CREATION IN AUGMENTED REALITY ENVIRONMENT

CROSS-REFERENCE TO RELATED APPLICATION

This application is based on and claims priority under 35 U.S.C. § 119 to Indian Patent Application No. 201911033920, filed on Aug. 22, 2019, in the India Patent Office, the disclosure of which is incorporated by reference herein in its entirety.

BACKGROUND

1. Field

The present disclosure relates generally to augmented reality. The disclosure, more particularly, relates to content creation in augmented reality environment.

2. Description of Related Art

Augmented reality is an enhanced version of reality where direct and/or indirect views of the physical real world environments are augmented with virtual superimposed computer-generated graphics, images, animations, 3D models, sounds and the like, to enhance a viewer's perception of reality. In other words, augmented reality involves using the existing environment and overlaying information on it to make a new artificial environment. Through augmented reality information about the physical real world can be made interactive to highlight certain objects, enhance understandings, and provide data regarding the same.

Augmented reality can be displayed on a wide variety of displays, such as screens of mobile devices or tablets, head-mounted displays, augmented realty glasses, and the like. Augmented reality can be used for purposes as simple as a text-messaging or as complicated as an instruction on how to perform a surgical procedure.

There have been several endeavors to implement augmented reality based applications that allow creation and sharing of messages having textual content, notes, graphical content, animated content, and the like, superimposed on a real world environment. For example, augmented reality based messaging applications such as 'SNAPPY', 'TRACES', 'WALLAME', 'JUST A LINEF', etc. allow creation and sharing of such type of messages. However, these applications allow content/message creation only on a mobile phone screen.

Similarly, augmented reality based devices such as MANOMOTION, HOLOLENS, LEAP MOTION, etc. are also available that support hand gestures and carry out different functions based on the hand gestures. U.S. Pat. No. 8,638,989 relates to LEAP MOTION and mentions methods and systems for identifying shapes and capturing motions of human hand in three-dimensional space. United States Patent publication US20120113223 relates to the HOLOLENS device of Microsoft Corporation, and mentions techniques for user-interaction in augmented reality wherein a user's touch or hand gestures directly manipulate a user interface (i.e. the graphics in the augmented reality). However, both LEAP MOTION and HOLOLENS are limited to hand gesture recognition and do not support creation and sharing of content/messages. Moreover, in such devices there is lack of active communication between a gesture generator which is typically worn on a hand and an augmented reality display device, which may cause delays in carrying out the functions. Furthermore, the generation of gestures by hand movements is a cumbersome activity as it can cause physical fatigue consequently leading to inaccurate gestures and incorrect functions.

United States Patent publication US20110164000 relates to a communicating stylus and United States Patent publication US2018018830 relates to a smart pen with flexible display, both of which are capable of writing on any surface or in three-dimensional space. The written images or text are saved and subsequently displayed on a display of a computing device which introduces delay in the displaying. However, both the communicating stylus and the smart pen are incapable of facilitating creation and sharing of content/messages based on augmented reality.

There is therefore felt a need of solution which enables augmented reality based content creation and sharing, and at the same time also enables manipulation of the content in three-dimensional space.

SUMMARY

This summary is provided to introduce concepts of the disclosure related to content creation in AR environment, as disclosed herein. This summary is neither intended to identify essential features of the disclosure as per the present disclosure nor is it intended for use in determining or limiting the scope of the disclosure as per the present disclosure.

In accordance with an embodiment of the present disclosure, there is provided a method for creating content in an augmented reality environment. The method comprises pairing a handheld device with an augmented reality (AR) device. The method further comprises generating, by the handheld device, at least one command in connection with an object of interest. The method further comprises generating, by the handheld device, data in connection with an object of interest. The method further comprises transmitting, by the handheld device, the at least one command and the data to the AR device. The method further comprises determining, by the AR device, a context in relation to the object of interest corresponding to the at least one command and the data. The method further comprises creating, by the AR device, a content based on the context and the data. The method further comprises rendering, by the AR device, the created content.

The method further comprises authenticating, by the AR device or an external device, a content recipient. The method further comprises authenticating, by the AR device or the external device, at least one condition set by a content creator for delivery of a content created by the creator. The method further comprises notifying, by the AR device or the external device to the content recipient, creation of the content by the content creator upon successful authentication of the at least one condition. The method further comprises retrieving, by the AR device, the created content. The method further comprises rendering, by the AR device, for the content recipient, the created content.

In accordance with another embodiment of the present disclosure, there is provided a method for creating and retrieving content in an augmented reality environment. The method comprises pairing a handheld device with an augmented reality (AR) device. The method further comprises generating, by the handheld device, in response to an operation of an input means of the handheld device performed by a content creator, a first command in connection with an object of interest of the content creator. The method further comprises generating, by the handheld device, in response to a maneuvering of the handheld device by the content creator, data in connection with the object of interest of the content creator. The method further comprises transmitting, by the handheld device, the first command and data to the AR device. The method further comprises determining, by the AR device, a context in relation to the object of interest corresponding to the first command and data. The method further comprises creating, by the AR device, a content based on the context and the data. The method further comprises rendering, by the AR device, for the content creator, the created content. The method further comprises authenticating, by the AR device or an external device, a content recipient. The method further comprises authenticating, by the AR device or the external device, at least one condition set by the content creator for delivery of the content created by the creator. The method further comprises notifying, by the AR device or the external device to the content recipient, creation of the content by the content creator upon successful authentication of the at least one condition. The method further comprises generating, by the handheld device, in response to an operation of an input means of the handheld device performed by the content recipient, a second command in connection with the created content. The method further comprises transmitting, by the handheld device, the second command to the AR device. The method further comprises retrieving, by the AR device, the created content based on the second command. The method further comprises rendering, by the AR device, for the second user, the created content.

In accordance with another embodiment of the present disclosure, there is provided a system for content creation in an augmented reality environment. The system comprises a handheld device configured to generate at least one command in connection with an object of interest. The handheld device is further configured to generate data in connection with the object of interest. The handheld device is further configured to transmit the at least one command and the data. The system further comprises an augmented reality (AR) device, wherein the AR device is paired with the handheld device. The AR device is configured to receive the at least one command and the data. The AR device is further configured to determine a context in relation to the object of interest corresponding to the at least one command and the data. The AR device is further configured to create a content based on the context and the data. The AR device is further configured to render the created content on a display unit of the AR device.

In accordance with another embodiment of the present disclosure, there is provided a system for content creation in an augmented reality environment comprising a handheld device comprising a command generator configured to generate at least one command in connection with an object of interest. The handheld device further comprises a data generator configured to generate data in connection with the object of interest. The handheld device further comprises a handheld device interface unit configured to transmit the at least one command and the data. The system further comprises an augmented reality (AR) device, wherein the AR device is paired with the handheld device. The AR device comprises an AR device interface unit configured to receive the at least one command and the data. The AR device interface unit includes a command and data decoder configured to decode the at least one command and the data. The AR device further comprises a context builder module configured to determine a context in relation to the object of interest corresponding to the at least one command and the data. The AR device further comprises a content creator module configured to create a content based on the context and the data. The AR device further comprises a display unit configured to display the created content.

In accordance with another embodiment of the present disclosure, there is provided a system for content creation in an augmented reality environment comprising a handheld device comprising an input means to enable generation of at least one command by an operation thereof to be performed by a content creator. The handheld device further comprises a plurality of sensors configured to generate sensor data in response to a movement of the handheld device by the content creator. The handheld device further comprises a processor cooperating with the input means, the sensors and a memory. The processor is configured to execute a set of instructions stored in the memory to implement a command generator configured to generate, in response to the operation of the input means performed by the content creator, the at least one command in connection with an object of interest. The processor is further configured to implement a data generator configured to combine the sensor data to generate object data in connection with the object of interest. The processor is further configured to implement a handheld device interface unit configured to transmit the at least one command and the object data. The system further comprises an augmented reality (AR) device, wherein the AR device is paired with the handheld device. The AR device comprises a processor cooperating with a memory and configured to execute a set of instructions stored in the memory. The processor is configured to implement an AR device interface unit configured to receive the at least one command and the object data. The AR device interface unit includes a command and data decoder configured to decode the at least one command and the object data. The processor is further configured to implement a context builder module configured to determine a context in relation to the object of interest corresponding to the at least one command and the object data. The processor is further configured to implement a content creator module configured to create a content based on the context and the object data. The AR device further comprises a display unit configured to display the created content.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and modules.

FIG. 2A illustrates a flowchart depicting the operations involved in a method for creating content in AR environment, in accordance with an embodiment with the present disclosure.

FIGS. 12A-12B, 13-15 and 16A-16B illustrate different implementations of the present disclosure for creating content in AR environment.

It should be appreciated by those skilled in the art that any block diagrams herein represent conceptual views of illustrative methods embodying the principles of the present disclosure. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The various embodiments of the present disclosure describe about different systems and methods for creating content in augmented reality (AR) environment.

In the following description, for purpose of explanation, specific details are set forth in order to provide an understanding of the present disclosure. It will be apparent, however, to one skilled in the art that the present disclosure may be practiced without these details. One skilled in the art will recognize that embodiments of the present disclosure, some of which are described below, may be incorporated into a number of systems.

However, the methods and systems are not limited to the specific embodiments described herein. Further, structures and devices shown in the figures are illustrative of embodiments of the present disclosure and are meant to avoid obscuring of the present disclosure.

It should be noted that the description merely illustrates the principles of the present disclosure. It will thus be appreciated that those skilled in the art will be able to devise various arrangements that, although not explicitly described herein, embody the principles of the present disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Figure 1:
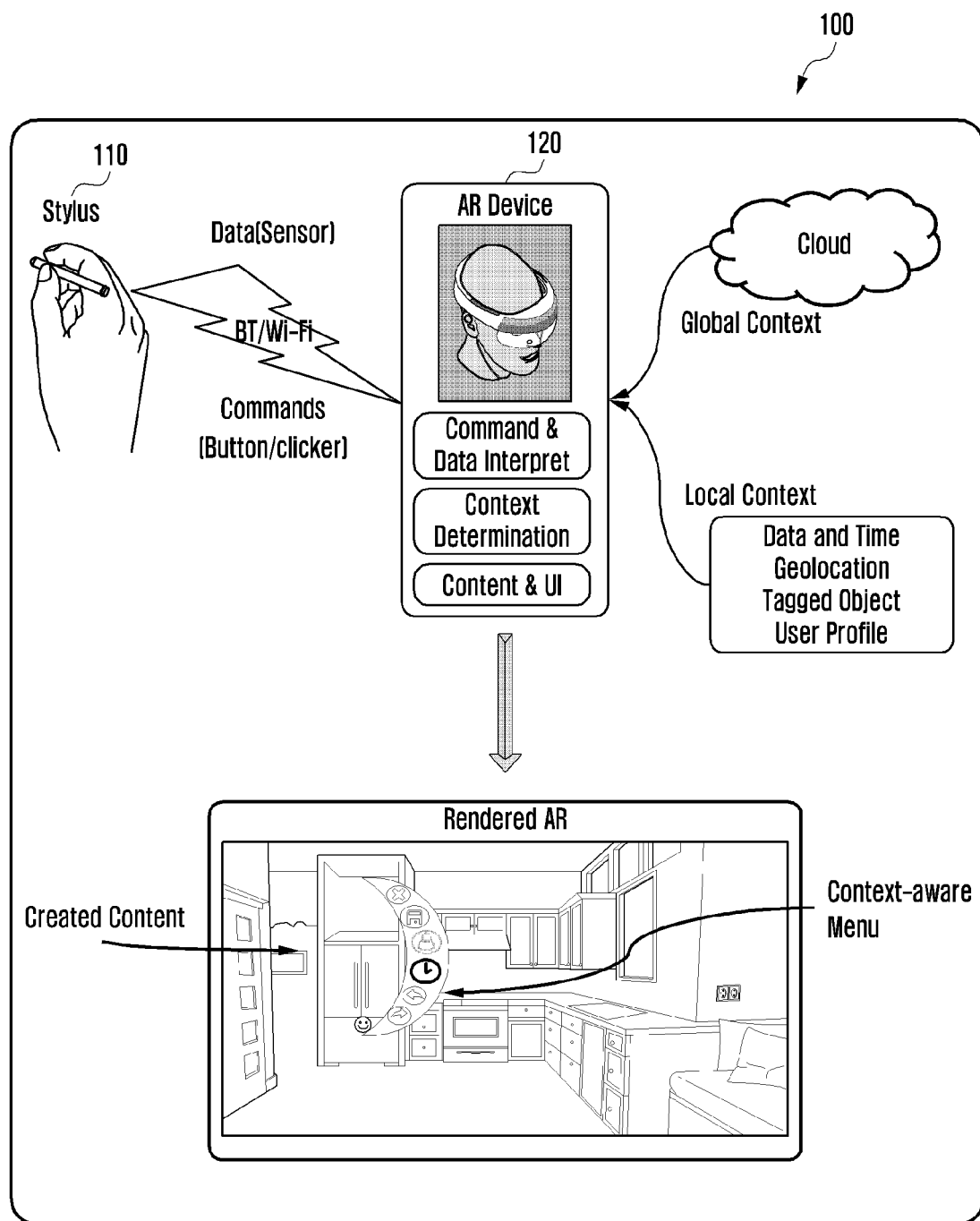
FIG. 1 illustrates an overview of a system for content creation in AR environment, in accordance with an embodiment with the present disclosure.

In accordance with an embodiment of the present disclosure as shown in FIG. 1, a system (100) for content creation in an augmented reality environment comprises a handheld device (110) (e.g., first electronic device) configured to generate at least one command in connection with an object of interest. The handheld device (110) is further configured to generate data in connection with the object of interest. The handheld device (110) is further configured to transmit the at least one command and the data. The system (100) further comprises an augmented reality (AR) device (120) (e.g., second electronic device), wherein the AR device (120) is paired with the handheld device (110). The AR device (120) is configured to receive the at least one command and the data. The AR device (120) is further configured to determine a context in relation to the object of interest corresponding to the at least one command and the data. The AR device (120) is further configured to create a content based on the context and the data. The AR device (120) is further configured to render the created content on a display unit of the AR device (120).

In an aspect, an active communication is established between the handheld device (110) and the AR device (120) to pair the handheld device (110) with the AR device (120), whereby the handheld device (110) is configured to initiate a session and the AR device (120) is configured to recognize and track the object of interest and lock the object of interest to establish the session.

In an aspect, the handheld device (110) is configured to generate a combination of a command and data for tagging the object of interest, and the AR device (120) is configured to lock the object of interest upon receiving the command and data for tagging the object of interest.

In an aspect, the handheld device (110) includes an input means to enable generation of the at least one command by an operation thereof, and a plurality of sensors to enable generation of the data.

In an aspect, the input means is selected from button, click, capacitive touch switch, resistive touch switch and piezo touch switch, and the sensors are selected from a pressure sensor, a gyro, an accelerometer, a magnetic sensor, a proximity sensor and a grip sensor.

In an aspect, the handheld device (110) is configured to generate the data in the event of manoeuvre of the handheld device (110) in three-dimensional (3D) space relative to the object of interest.

In an aspect, the handheld device (110) is manoeuvred in a direction selected from: a direction which simulates writing of one or more characters in 3D space, a direction which simulates drawing of one or more characters or figures in 3D space, a direction which simulates flicking of the handheld device (110), and a direction which simulates which simulates tapping on one or more menu options in 3D space.

In an aspect, the characters are selected from alphabets, numbers and symbols; and figures include geometrical figures.

In an aspect, to determine the context, the AR device (120) is configured to capture at least one parameter selected from a global context, a local context, and one or more other objects in a field of view of the AR device (120) when recognizing the object of interest. The AR device (120) is further configured to identify a profile of a content creator. The AR device (120) is further configured to identify the context of the object of interest based on combination of the at least one command, the data in connection with the object of interest, the captured parameter and the identified profile of the content creator. The AR device (120) is further configured to render an action list and a menu option for content creation based on the identified context. The AR device (120) is further configured to analyse the rendered action list and the menu option. The AR device (120) is further configured to build the context based on the analysed action list, menu and the identified context, thereby determining the context.

In an aspect, the AR device (120) is further configured to aggregate the identified context, classify the aggregated context, and infer the classified context.

In an aspect, the global context includes data belonging to the content creator stored on a cloud server, and the local context includes, date and time of recognizing the object of interest, geolocation of the object of interest and physical conditions of the object of interest.

In an aspect, to create the content, the AR device (120) is configured to capture the built context. The AR device (120) is further configured to generate a subsequent context-aware action list and a subsequent context-aware menu, based on the built context and the data. The AR device (120) is further configured to render the subsequent context-aware action-list and the subsequent context-aware menu on the display unit of the AR device (120) for content creation.

FIG. 1 generally illustrates an overview of the system (100) for content creation in an AR environment according to the aforesaid embodiment. A first user, referred to as the content creator, who is interested in creating and sharing content has to use both the handheld device (110) and the AR device (120) for the same. Initially the handheld device (110) is paired with the AR device (120) to establish a session between the handheld device (110) and the AR device (120). In order to pair the handheld device (110) with the AR device (120), an active communication is established between the handheld device (110) and the AR device (120). The handheld device (110) then initiates the session whereupon the AR device (120) worn by the content creator recognizes and tracks one or more real world objects in connection with which the content creator is interested in creating content. The handheld device (110) then generates a combination of a command and data for tagging at least one object of interest of the content creator and transmits the same to the AR device (120) through the active communication (e.g., communication link) therebetween. The AR device (120), upon receiving the tagging command and data, then locks the object of interest of the content creator to establish the session. The AR device (120) typically comprises a camera whereby the real world objects in a field of view of the camera get recognized and tracked and the object of interest of the content creator gets locked by the AR device (120).

Once the session is established, the handheld device (110) generates at least one command or a first command for creating content in connection with the object of interest of the content creator, and further generates data for creating content in connection with the object of interest of the content creator. The handheld device (110) then transmits the said command and data for creating content to the AR device (120) through the active communication therebetween. The AR device (120), upon receiving the said command and data for creating content, interprets the said command and data and determines a context based on the same. In other words, the AR device (120) determines that context which relates to the object of interest and corresponds to said command and data for creating content. Thereafter, the AR device (120) creates the content based on the context and renders the same on a display of the AR device (120) for the content creator. The AR device (120) builds a graphic user interface (UI) and renders the content in the UI to enable the content creator to save and share the same.

The handheld device (110) comprises an input means to enable generation of the commands. The content creator can operate the input means in a particular manner to generate the commands. The input means can comprise one or more buttons, one or more clicks, one or more touch switches such as, but not limited to, capacitive touch switch, resistive touch switch, piezo touch switch, and the like or a combination of all the aforesaid input means. In case the input means comprises buttons, the content creator can operate the buttons in particular manner to generate commands, wherein each manner of pressing the buttons constitutes an operation and hence a command. For example, pressing a button a predetermined number of times can constitute a tagging/object recognition operation and a tagging/object recognition command for tagging the object of interest, pressing the button for a predetermined short-time duration can constitute an initiation operation and an initiation command for initiating a session, operating the button by pressing the button for a predetermined long-time duration can constitute a detection operation and a detection command to detect the shape of the object of interest, etc. In case the input means comprises touch switches, the content creator can operate the touch switches in particular manner to generate commands, wherein each manner of operating the touch switches can constitute an operation and hence a command. For example, increased capacitance/resistance level in a capacitive/resistive touch switch can constitute an initiation operation and an initiation command for initiating a session. In case the input means comprises a combination of the buttons, switches etc., the content creator can operate the buttons and switches in particular manner to generate commands.

The handheld device (110) also comprises a plurality of sensors to enable generation of data. The sensors include, but are not limited to, pressure sensor, gyro, accelerometer, magnetic sensor, proximity sensor, grip sensor, etc. The handheld device (110) can be maneuvered/moved/stroked by the content creator to generate data. The maneuvering/moving/stroking of the handheld device (110) can be carried out in three-dimensional (3D) space relative to the object of interest to generate data. For example, the handheld device (110) can be maneuvered in a direction which simulates writing of one or more characters in 3D space relative to the object of interest, drawing of one or more characters in 3D space relative to the object of interest, flicking of the handheld device (110), tapping on the displayed UI, and the like. The character can be alphabets, numbers, symbols, etc. The figures can be geometrical figures, freestyle shapes, and the like. The sensors included in the handheld device (110) detect the maneuvering of the handheld device (110) and generate data based on the same. For example, the sensors, upon detecting the maneuvering/moving of the handheld device (110) in a direction which stimulates writing of one or more characters in 3D space relative to the object of interest, will generate data representing the characters. Further, for example, the sensors upon detecting the maneuvering/moving of the handheld device (110) in a direction which simulates tagging on an objection recognition menu option in the displayed UI, will generate data representing an object recognition maneuver of the handheld device (110).

In order to interpret the said command and data for creating content as received from the handheld device (110) and determine the context, the AR device (120) performs additional operations. Firstly, the AR device (120) captures several parameters related to the object of interest and to the content creator. One of the parameters can be global context related to the content creator. The global context comprises data belonging to the content creator available on the internet or stored on cloud storage systems, and can include, for example, data about likes/dislikes of the content creator, activities of the content creator, etc. Another parameter can be local context related to the object of interest, and can include, for example, data and time when the object of interest is recognized and locked by the AR device (120), geolocation of the object of interest available typically from a GPS system incorporated in the AR device (120), and physical conditions of the object of interest. Another parameter can be the type of other real world objects in the vicinity of the object of interest of the content creator, which other real world objects can be recognized by the AR device (120) in its field of view while recognizing the object of interest of the content creator. After capturing one or more of the aforesaid parameters, the AR device (120) then identifies a profile of the content creator available on the internet or stored on cloud storage systems. The profile of the content creator can comprise information related to the name, age, education, job, etc. of the content creator.

The AR device (120) then identifies the context of the object of interest from the command and data received from the handheld device (110), one or more of the captured parameters and the identified profile of the content creator. Based on the identified context, the AR device (120) then renders an action list and a menu option for content creation in the UI on the display of the AR device (120). The AR device (120) aggregates the identified context, classifies the identified context into various categories, and infers the classified context to render the action list and the menu options on the display. The identified context can be classified into categories such as education related context, tourism related context, food related context, etc.; wherein education related context can be inferred, for example, as a type of educational subject such as mathematics, science, geography, etc.; tourism related context can be inferred as say adventure tourism, religious tourism, etc.; food related context can be inferred as say Indian food, continental food, etc. to render the action list and the menu options on the display. The AR device (120) then analyzes the rendered action list and the depth of the menu options and builds the context from the analyzed action list, menu options and the identified context, thereby determining the context.

In order to create the content, the AR device (120) captures the built context, and renders a subsequent or next-level context-aware action list in the UI and a subsequent or next-level context-aware menu options in the UI, based on the built context, the current action list and menu options, and the generated data received from the handheld device (110). The subsequent/next-level action list is referred to as context-aware action list as it makes available advanced actions in the UI which can be performed based on the determined context. Similarly, the subsequent/next-level menu options are referred to as context-aware menu options as they provide advanced options in the UI which are based on the determined context. Each time a new command and/or data is received from the handheld device (110), the AR device (120) updates the UI accordingly with next-level actions lists and menu options. The content created from the actions lists and the menu options can be saved and shared by the content creator.

The system (100) for content creation as described above also facilitates retrieval of the created content. A second user, hereinafter referred to as a content recipient, who is interested in reading the shared content has to use the AR device (120) and optionally the handheld device (110) for retrieving the content. In order to retrieve the content, firstly, authentication of the content recipient is carried out. The content recipient upon wearing the AR device (120) will be prompted to authenticate himself/herself, either through an external device such as a mobile phone, computer, and the like and/or through the AR device (120) itself. Authentication through the external device may be carried out through password based authentication, one time password (OTP) based authentication, challenge based authentication such as identifying alphabetical characters, identifying objects in an image, and the like authentication techniques. Authentication through AR device (120) may be carried out by iris recognition, finger print scanning, voice recognition, and the like biometric authentication techniques.

After successful authentication of the content recipient, authentication of one or more delivery conditions set by the content creator for delivery of the created content is carried out. Delivery conditions can comprise confirming the local context parameter such as geolocation of the object of interest, physical conditions of the object of interest, etc., confirming the presence of other real world objects in the vicinity of the object of interest, and the like. Authentication of the delivery condition(s) can be carried out by the external device and/or through the AR device (120) itself. Upon successful authentication of the delivery condition(s), the content recipient is notified of the created content by the AR device (120) or the external device. Thereafter, the AR device (120) retrieves the created content and renders the same on the display of the AR device (120) for the content recipient to read.

The retrieval of the created content can also involve use of the handheld device (110). After content recipient is notified about the created content, the handheld device (110) is paired with the AR device (120) by establishing an active communication therebetween. The content recipient can then operate the input means of the handheld device (110) in a particular manner to generate a command and/or data for retrieving the created content. The handheld device (110) then generates at least one retrieval or a second command and/or data in connection with the created content. The handheld device (110) then transmits the second/retrieval command and/or data to the AR device (120) through the active communication therebetween. The AR device (120), upon receiving the command and data for creating content, interprets the second/retrieval command and/or data and retrieves the created content and renders the same on the display of the AR device (120) for the content recipient to read.

The system (100) for content creation in an AR environment as described herein above gives rise to a method (200a) for creating content in an AR environment as depicted in the flowchart illustrated in FIG. 2A. Referring to FIG. 2A, the method comprises at operation 202—pairing a handheld device (110) with an augmented reality (AR) device (120). The method further comprises at operation 204—generating, by the handheld device (110), at least one command in connection with an object of interest. The method further comprises at operation 206—generating, by the handheld device (110), data in connection with the object of interest. The method further comprises at operation 208—transmitting, by the handheld device (110), the at least one command and the data to the AR device (120). The method further comprises at operation 210—determining, by the AR device (120), a context in relation to the object of interest corresponding to the at least one command and the data. The method further comprises at operation 212—creating, by the AR device (120), a content based on the context and the data. The method further comprises at operation 214—rendering, by the AR device (120), the created content.

In an aspect of the method, the operation of pairing (202) the handheld device (110) with the AR device (120) includes establishing an active communication between the handheld device (110) and the AR device (120). The operation of pairing (202) further includes initiating, by the handheld device (110), a session. The operation of pairing (202) further includes recognizing, by the AR device (120), the object of interest. The operation of pairing (202) further includes locking, by the AR device (120), the object of interest to establish the session.

In an aspect of the method, the operation of locking the object of interest includes generating, by the handheld device (110), a combination of a command and data for tagging the object of interest; and locking, by the AR device (120), the object of interest upon receiving the command and data for tagging the object of interest.

In an aspect of the method, the operation of generating the at least one command includes operating an input means of the handheld device (110).

In an aspect of the method, the operation of generating the data includes manoeuvring the handheld device (110) in three-dimensional (3D) space relative to the object of interest.

In an aspect of the method, the operation of manoeuvring the handheld device (110) is selected from: moving the handheld device (110) in a direction which simulates writing of one or more characters in 3D space, moving the handheld device (110) in a direction which simulates drawing of one or more characters or figures in 3D space, moving the handheld device (110) in a direction which simulates flicking of the handheld device (110), and moving the handled device (110) in a manner which simulates tapping on one or more menu options in 3D space.

In an aspect of the method, the operation of determining the context includes capturing at least one parameter selected from a global context, a local context, and one or more other objects in a field of view of the AR device (120) when recognizing the object of interest. The operation of determining the context further includes identifying a profile of a content creator. The operation of determining the context further includes identifying the context of the object of interest based on combination of the at least one command, the data, the captured parameter and the identified profile of the content creator. The operation of determining the context further includes rendering an action list and a menu for creating the content based on the identified context. The operation of determining the context further includes analysing the rendered action list and the menu. The operation of determining the context further includes building the context based on the analysed action list, menu and the identified context.

In an aspect of the method, the operation of identifying the context includes aggregating the identified context, classifying the aggregated context and inferring the classified context.

In an aspect of the method, the operation of creating the content includes capturing the built context. The operation of creating the content further includes generating a subsequent context-aware action list and a subsequent context-aware menu, based on the built context and the data. The operation of creating content further includes rendering the subsequent action-list and the subsequent menu for creating the content.

The method further comprises authenticating, by the AR device (120) or an external device, a content recipient. The method further comprises authenticating, by the AR device (120) or the external device, at least one condition set by the content creator for delivery of the content created by the creator. The method further comprises notifying, by the AR device (120) or the external device to the content recipient, creation of the content by the content creator upon successful authentication of the at least one condition. The method further comprises retrieving, by the AR device (120), the created content. The method further comprises rendering, by the AR device (120), for the content recipient, the created content.

In an aspect of the method, the operation of retrieving the created content includes pairing by the content recipient, the handheld device (110) with the AR device (120). The operation of retrieving the created content further includes generating, by the handheld device (110), at least one retrieval command in connection with the created content. The operation of retrieving the created content further includes transmitting, by the handheld device (110), the at least one retrieval command to the AR device (120).

Figure 2B:
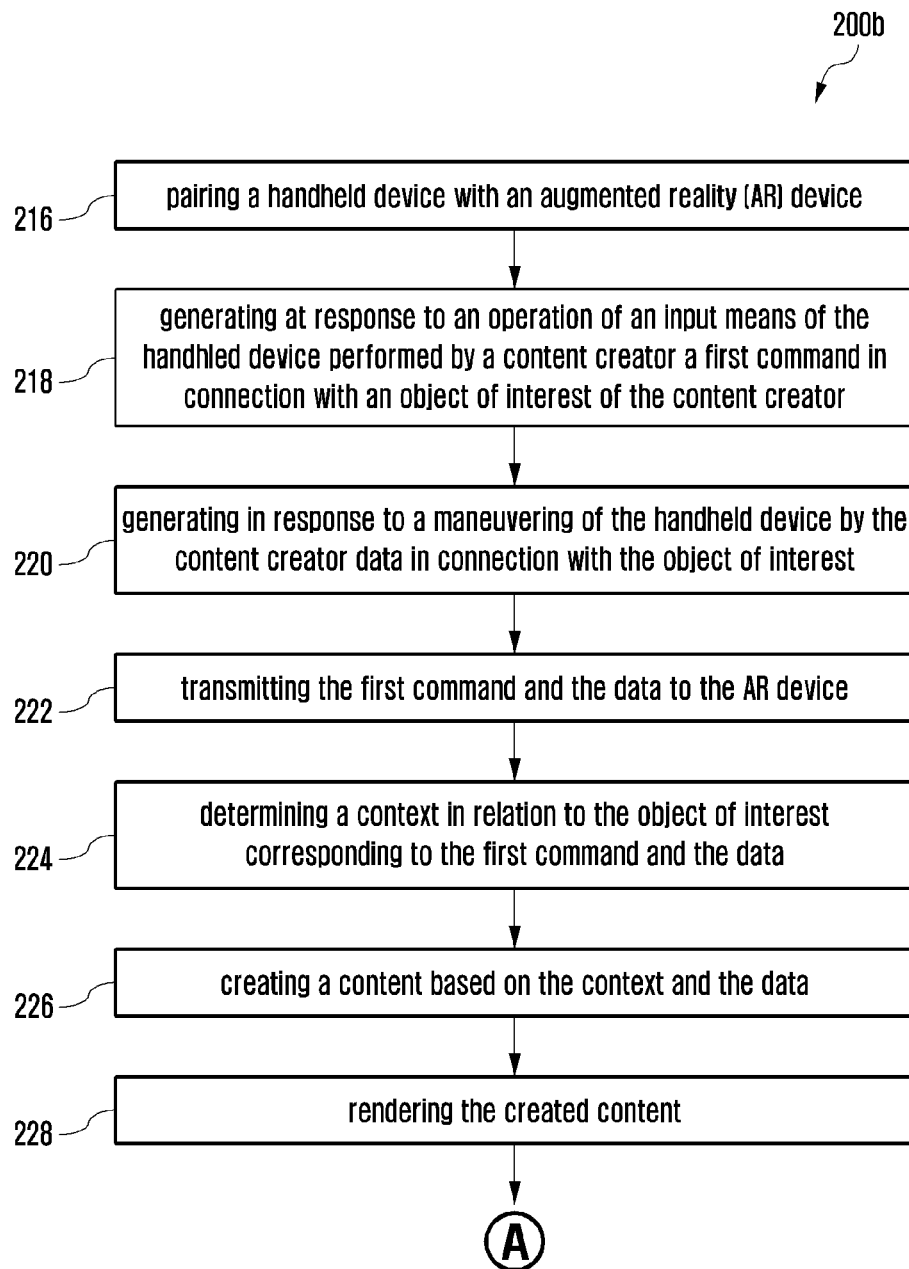
FIG. 2B-2C illustrates a flowchart depicting the operations involved in a method for creating and retrieving content in AR environment, in accordance with an embodiment with the present disclosure.
Figure 2C:
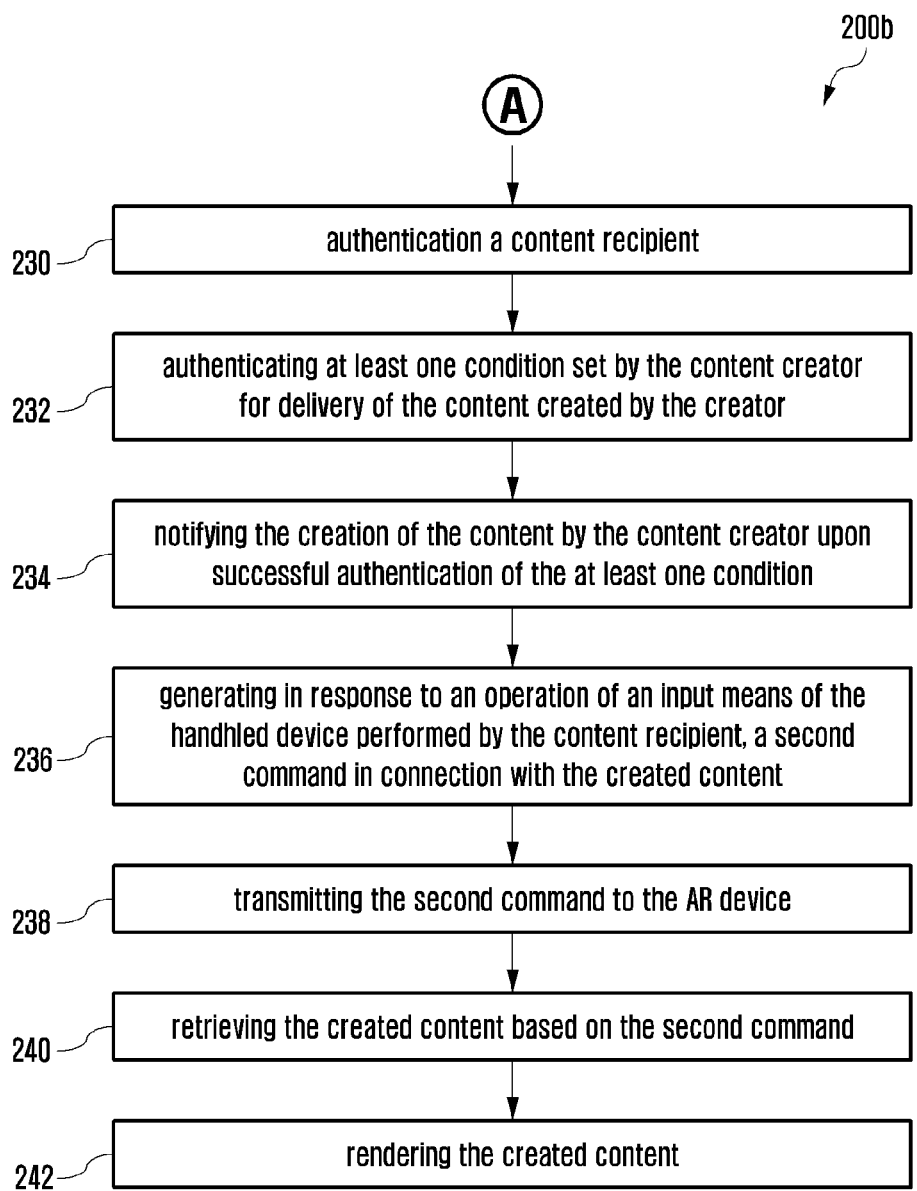

The system (100) for content creation in an AR environment as described herein above also gives rise to a method (200b) for creating and retrieving content in an AR environment as depicted in the flowchart illustrated in FIG. 2B-2C. Referring to FIG. 2B-2C, the method comprises at operation 216—pairing a handheld device (110) with an AR device (120). The method further comprises at operation 218—generating, by the handheld device (110), in response to an operation of an input means of the handheld device (110) performed by a content creator, a first command in connection with an object of interest of the content creator. The method further comprises at operation 220—generating, by the handheld device (110), in response to a maneuvering of the handheld device (110) by the content creator, data in connection with the object of interest of the content creator. The method further comprises at operation 222—transmitting, by the handheld device (110), the first command and data to the AR device (120). The method further comprises at operation 224—determining, by the AR device (120), a context in relation to the object of interest corresponding to the first command and data. The method further comprises at operation 226—creating, by the AR device (120), a content based on the context and the data. The method further comprises at operation 228—rendering, by the AR device (120), for the content creator, the created content. The method further comprises at operation 230—authenticating, by the AR device (120) or an external device, a content recipient. The method further comprises at operation 232—authenticating, by the AR device (120) or the external device, at least one condition set by the content creator for delivery of the content created by the creator. The method further comprises at operation 234—notifying, by the AR device (120) or the external device to the content recipient, creation of the content by the content creator upon successful authentication of the at least one condition. The method further comprises at operation 236—generating, by the handheld device (110), in response to an operation of an input means of the handheld device (110) performed by the content recipient, a second command in connection with the created content. The method further comprises at operation 238—transmitting, by the handheld device (110), the second command to the AR device (120). The method further comprises at operation 240—retrieving, by the AR device (120), the created content based on the second command. The method further comprises at operation 242—rendering, by the AR device (120), for the second user, the created content.

In an aspect of the method for creating and retrieving content, the operation of pairing the handheld device (110) with the AR device (120) includes the operation of establishing an active communication between the handheld device (110) and the AR device (120). This operation of pairing further includes initiating, by the handheld device (110), a session by generating an initiation command in response to an initiating operation of the input means of the handheld device (110) performed by the content creator. This operation of pairing further includes recognizing, by the AR device (120), the object of interest. This operation of pairing further includes locking, by the AR device (120), the object of interest upon receiving the combination of command and data for tagging the object of interest, to establish the session.

In an aspect of the method for creating and retrieving content, the operation of locking the object of interest includes generating, by the handheld device (110), a combination of a command and data for tagging the object of interest in response to an object recognition operation of the input means and an object recognition manoeuvre of the handheld device (110) performed by the content creator; and locking, by the AR device (120), the object of interest upon receiving the command and data for tagging the object of interest.

Figure 3:
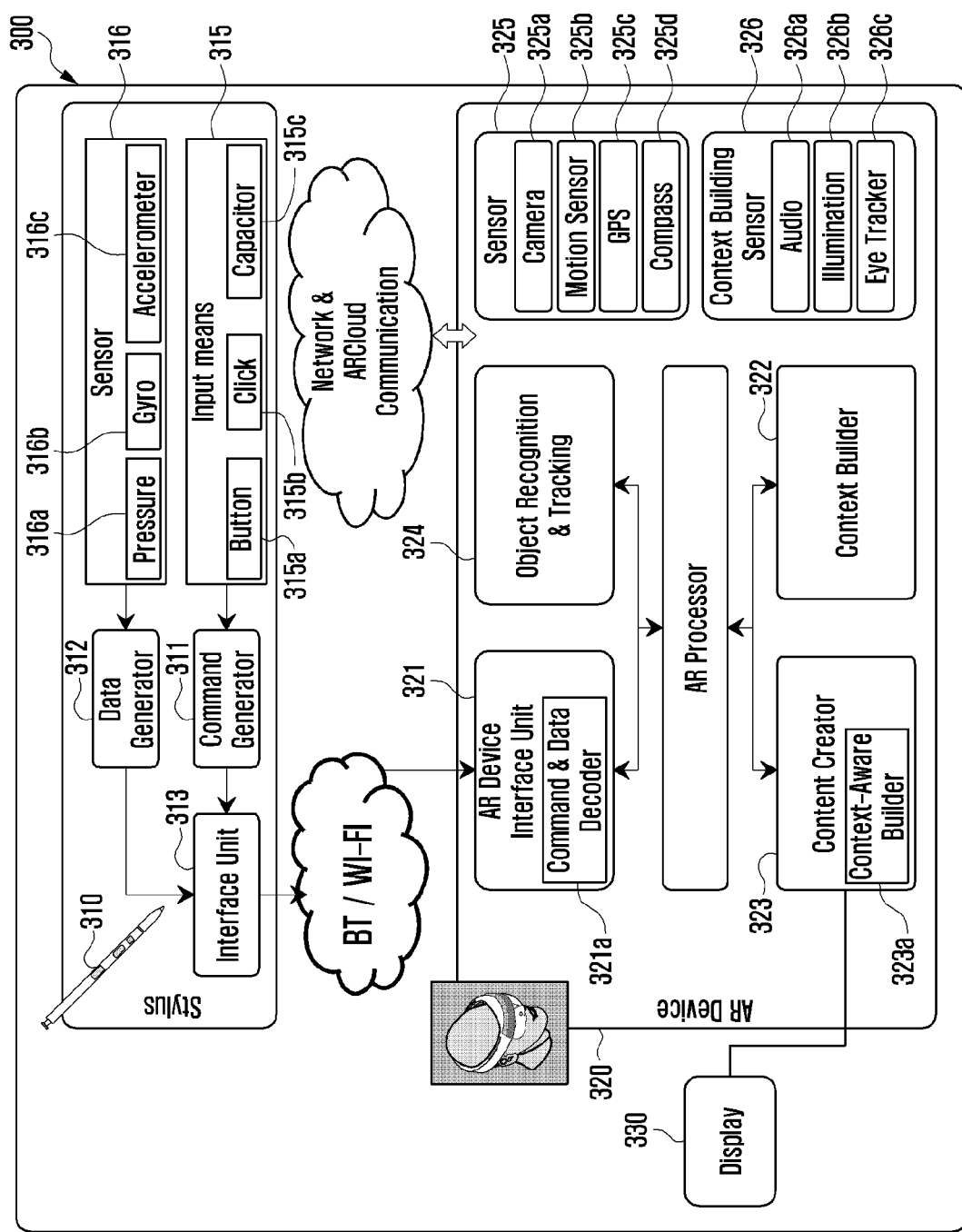
FIG. 3 illustrates a block diagram of a system for content creation in AR environment, in accordance with another embodiment of the present disclosure.

In accordance with another embodiment of the present disclosure as shown in FIG. 3, a system (300) for content creation in an augmented reality environment comprises a handheld device (310) comprising a command generator (311) configured to generate at least one command in connection with an object of interest. The handheld device (310) further comprises a data generator (312) configured to generate data in connection with the object of interest. The handheld device (310) further comprises a handheld device interface unit (313) configured to transmit the at least one command and the data. The system (300) further comprises an augmented reality (AR) device (320), wherein the AR device (320) is paired with the handheld device (310). The AR device (320) comprises an AR device interface unit (321) configured to receive the at least one command and the data. The AR device interface unit (321) includes a command and data decoder (321a) configured to decode the at least one command and the data. The AR device (320) further comprises a context builder module (322) configured to determine a context in relation to the object of interest corresponding to the at least one command and the data. The AR device (320) further comprises a content creator module (323) configured to create a content based on the context and the data. The AR device (320) further comprises a display unit (330) configured to display the created content.

In an aspect, an active communication is established between the handheld device (310) and the AR device (320) to pair the handheld device (310) with the AR device (320), whereupon the command generator (311) is configured to initiate a session and generate a command for tagging the object of interest, the data generator (312) is configured to generate data for tagging the object of interest, and the handheld device interface unit (313) is configured to combine the command and data for tagging the object of interest and transmit the combination of the command and data. Further, the AR device (320) further comprises an object recognition and tracking module (324) configured to recognize the object of interest and lock the object of interest upon receiving the command and data for tagging the object of interest through the active communication therebetween, to establish the session.

In an aspect, the handheld device (310) includes an input means (315) to enable generation of the at least one command by an operation thereof, and the command generator (311) is configured to generate the at least one command based on the operation of the input means (315).

In an aspect, the input means (315) is selected from button (315a), click (315b), capacitive touch switch (315c), resistive touch switch and piezo touch switch. For the sake of brevity, only few of the input means are shown in FIG. 3, and the input means is not intended to be limited to those shown in FIG. 3.

In an aspect, the handheld device (310) includes a plurality of sensors (316) configured to generate data in the event of manoeuvre of the handheld device (310) in three-dimensional (3D) space relative to the object of interest, and the data generator (312) is configured to combine data generated by the sensors (316) to generate the data in connection with the object of interest.

In an aspect, the sensors are selected from a pressure sensor (316a), a gyro (316b), an accelerometer (316c), a magnetic sensor, a proximity sensor and a grip sensor. For the sake of brevity, only few of the sensors are shown in FIG. 3, and the sensors are not intended to be limited to those shown in FIG. 3.

Figure 5A:
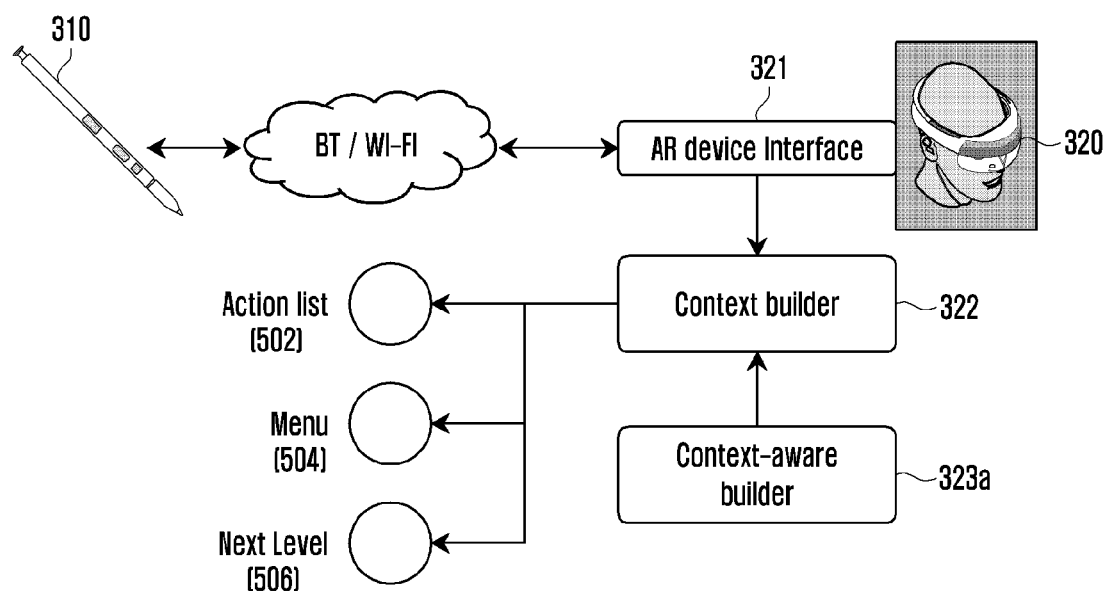
FIG. 5A illustrates a flow diagram for creating action list(s) for content creation in AR environment by at least the system illustrated in FIG. 3.
Figure 5B:
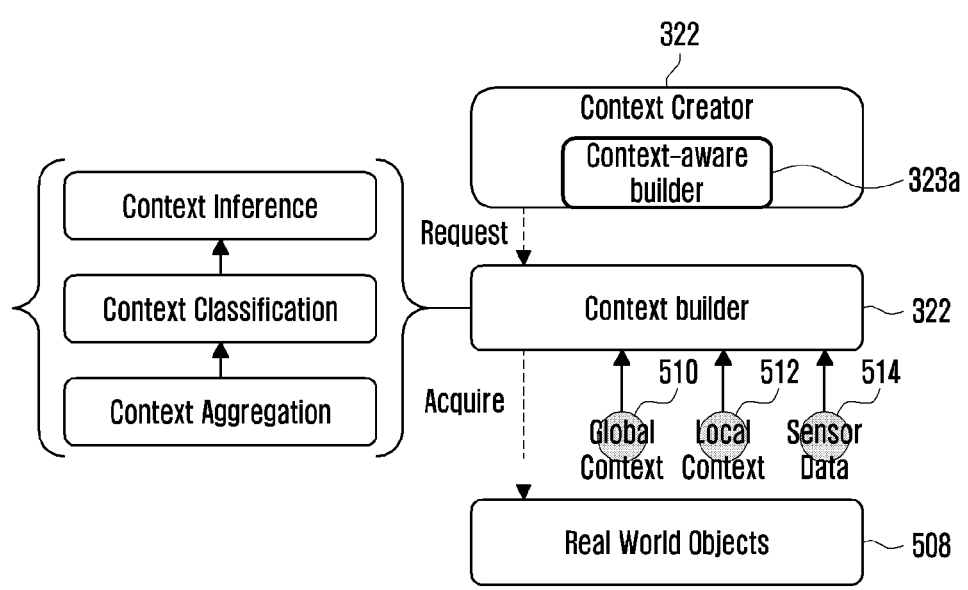
FIG. 5B illustrates a flow diagram for determining a context for content creation in AR environment by at least the system illustrated in FIG. 3.

Referring to FIGS. 5A and 5B, in an aspect, to determine the context, the context builder module (322) is configured to capture at least one parameter selected from a global context (510), a local context (512), and one or more other objects (508) in a field of view of the AR device (320) when the object recognition and tracking module (324) recognizes the object of interest. The context builder module (322) is further configured to identify a profile of a content creator. The context builder module (322) is further configured to identify the context of the object of interest based on combination of the at least one command, the data (514) in connection with the object of interest, the captured parameter and the identified profile of the content creator. The context builder module (322) is further configured to render an action list (502) and a menu option (504) for content creation based on the identified context. The context builder module (322) is further configured to analyse the rendered action list and the menu option. The context builder module (322) is further configured to build the context based on the analysed action list, menu and the identified context.

In an aspect, the context builder module (322) is further configured to aggregate the identified context, classify the aggregated context, and infer the classified context [refer FIG. 5B].

Figure 5C:
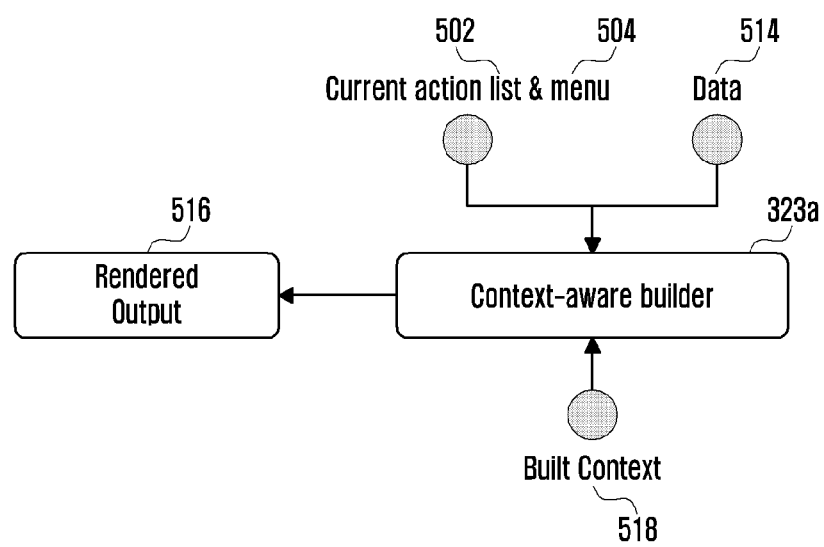
FIG. 5C illustrates a flow diagram for rendering a created content in AR environment by at least the system illustrated in FIG. 3.

Referring to FIG. 5C, in an aspect, to create the content, the content creator module (323) includes a context-aware builder module (323a) configured to capture the built context. The context-aware builder module (323a) is further configured to generate a subsequent context-aware action list (502) and a subsequent context-aware menu (504), based on the built context (518) and the data (514). The context-aware builder module (323a) is further configured to render the subsequent action-list and the subsequent menu on the display unit (330) of the AR device (320) for content creation (516).

In an aspect, the AR device (320) further comprises a plurality of object recognition and tracking sensors (325) connected to the object recognition and tracking module (324).

In an aspect, the object recognition and tracking sensors (325) are selected from camera (325a), motion sensor (325b), GPS (325c) and compass (325d).

In an aspect, the AR device (320) includes a network communication unit and a plurality of context building sensors (326) connected to the context builder module (322). The context building sensors are selected from audio sensor (326a), light/illumination sensor (326b) and eye tracker (326c).

In an aspect, the handheld device (310) is selected from a stylus or a pen, and the AR device (320) is selected from wearable AR glasses or a computing device such mobile phone, tablet, laptop, and the like.

FIG. 3 illustrates a block diagram of the system (300) for content creation in AR environment in accordance with another embodiment of the present disclosure. The content creator who is interested in creating and sharing content has to use both the handheld device (310), for example, a stylus, a pen, and the like, and the AR device (320) for example wearable AR glasses for the creating and sharing content. Initially the handheld device (310) is paired with the AR device (320) by establishing an active communication therebetween to establish a session between the handheld device (310) and the AR device (320). The active communication can be established through communication techniques such as BLUETOOTH, WIFI, and the like. The command generator (311) in the handheld device (310) then initiates the session by generating a command for tagging the object of interest, and the data generator (312) generates data for tagging the object of interest. The handheld device interface unit (313) then combines the command and data for tagging the object of interest and transmits the combination of the command and data to the AR device (320) through the active communication therebetween. The object recognition and tracking module (324) in the AR device (320) recognizes the object of interest through the camera (325a) and upon receiving the combination of the command and data for tagging the object of interest, locks the object of interest to establish the session.

Once the session is established, the command generator (311) in the handheld device (310) generates at least one command or a first command for creating content in connection with the object of interest of the content creator, and the data generator (312) generates data for creating content in connection with the object of interest of the content creator. The handheld device interface unit (313) then transmits the said command and data for creating content to the AR device (320) through the active communication of BLUETOOTH, WIFI, and the like established therebetween. The AR device interface unit (321) receives the said command and data for creating content, whereupon the command and data decoder (321a) decodes the said command and data and provides the same to the context builder module (322). The context builder module (322) determines a context in relation to the object of interest corresponding to the said command and data. In other words, the AR device (320) determines that context which relates to the object of interest and corresponds to said command and data for creating content. Thereafter, the content creator module (323) creates the content based on the context and the data and renders the same on the display (330) of the AR device (320) for the content creator. The content creator module (323) builds a graphic user interface (UI) and renders the content in the UI to enable the content creator to save and share the same.

In order to interpret the said command and data for creating content as received from the handheld device (310) and determine the context, the context builder module (322) in the AR device (320) performs additional operations. Firstly, the context builder module (322) captures several parameters related to the object of interest and to the content creator. One of the parameters can be global context related to the content creator. The global context comprises data belonging to the content creator available on the internet or stored on cloud storage systems, and can include, for example, data about likes/dislikes of the content creator, activities of the content creator, etc. Another parameter can be local context related to the object of interest, and can include, for example, data and time when the object of interest is recognized and locked by the object recognition and tracking module (324), geolocation of the object of interest available typically from the GPS (325b) incorporated in the AR device (320), and physical conditions of the object of interest. Another parameter can be the type of other real world objects in the vicinity of the object of interest of the content creator, which other real world objects can be recognized by the object recognition and tracking module (324) in field of view of the camera (325a) while recognizing the object of interest of the content creator. After capturing one or more of the aforesaid parameters, the context builder module (322) then identifies a profile of the content creator available on the internet or stored on cloud storage systems. The profile of the content creator can comprise information related to the name, age, education, job, etc. of the content creator.

Figure 4:
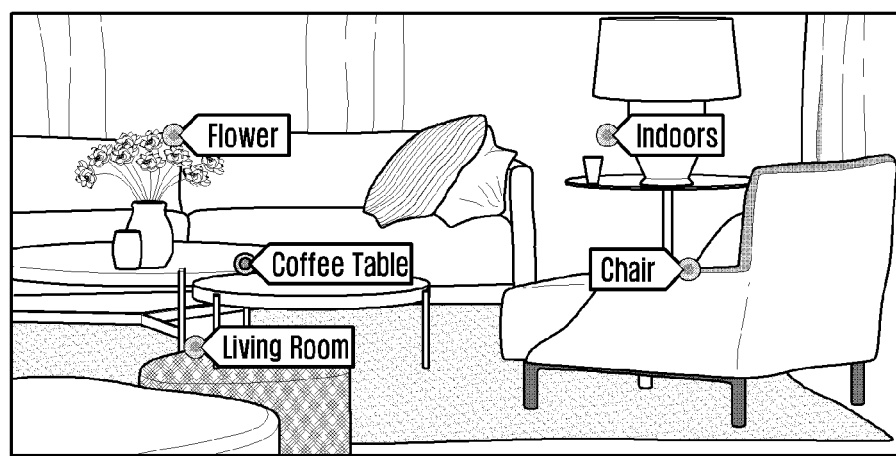
FIG. 4 illustrates a pictorial view of one or more objects recognized and tracked by the system of FIG. 3.

The object recognition and tracking module (324) employs known image processing techniques to recognize the real world objects. FIG. 4 generally illustrates a pictorial view of the real world objects recognized and tracked by the object recognition and tracking module (324) through the camera (325a).

Referring to FIGS. 5A and 5B, the context builder module (322) then identifies the context of the object of interest from the said command and data received from the handheld device (310), one or more of the captured parameters and the identified profile of the content creator. Based on the identified context, the context builder module (322) then renders an action list (502) and a menu option (504) for content creation in the UI on the display (330) of the AR device (320). The context builder module (322) aggregates the identified context, classifies the identified context into various categories, and infers the classified context to render the action list and the menu options on the display (330). The identified context can be classified into categories such as education related context, tourism related context, food related context, etc.; wherein education related context can be inferred, for example, as a type of educational subject such as mathematics, science, geography, etc.; tourism related context can be inferred as say adventure tourism, religious tourism, etc.; food related context can be inferred as say Indian food, continental food, etc. to render the action list and the menu options on the display. The context builder module (322) then analyzes the rendered action list and the depth of the menu options and builds the context from the analyzed action list, menu options and the identified context, thereby determining the context.

Referring to FIG. 5C, in order to create the content, the context-aware builder module (323a) in the content creator module (323) captures the built context (518), and renders a subsequent or next-level context-aware action list (506) in the UI and a subsequent or next-level context-aware menu options (506) in the UI, based on the built context (518), the current action list (502) and menu options (504), and the generated data (514) received from the handheld device (310). The subsequent/next-level action list is referred to as context-aware action list as it makes available advanced actions in the UI which can be performed based on the determined context. Similarly, the subsequent/next-level menu options are referred to as context-aware menu options as they provide advanced options in the UI which are based on the determined context. Each time a new command and/or data is received from the handheld device (310), the content creator module (323) updates the UI accordingly with next-level actions lists and menu options. The content created from the actions lists and the menu options can be saved and shared by the content creator.

Figure 6:
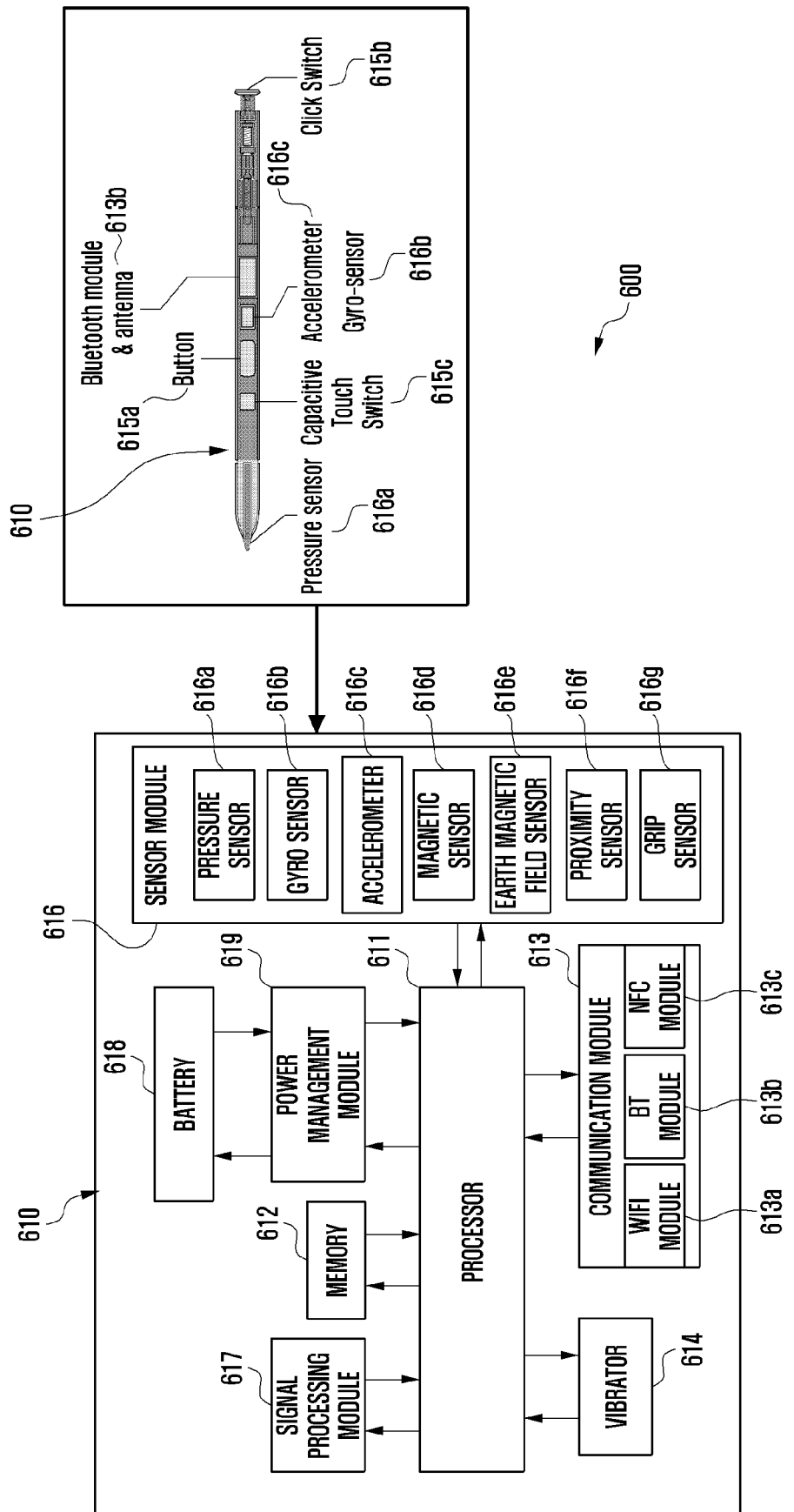
FIG. 6 illustrates a detailed structural block diagram of a handheld device of a system for content creation in AR environment, in accordance with yet another embodiment of the present disclosure.
Figure 7:
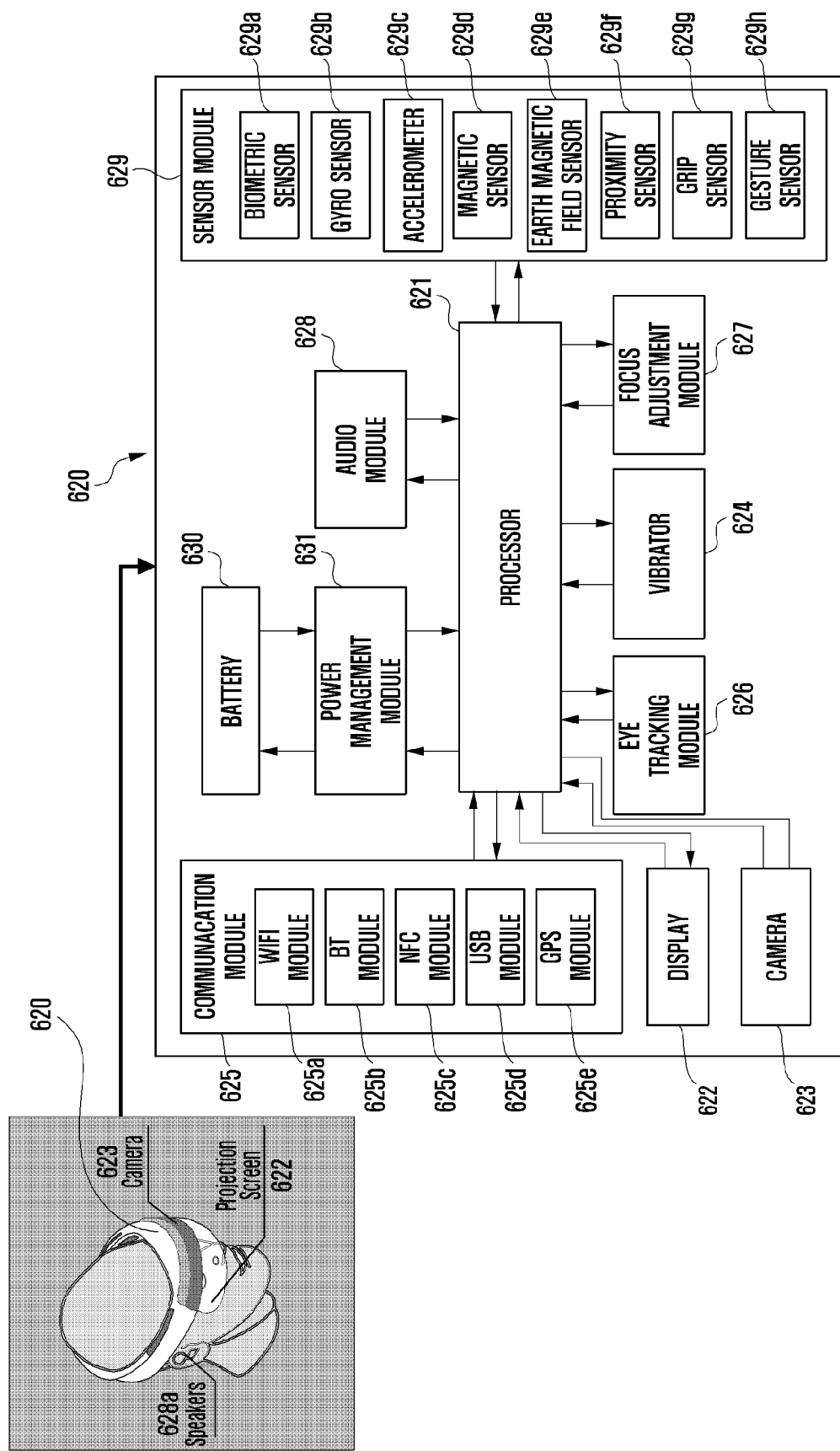
FIG. 7 illustrates a detailed structural block diagram of an AR device of the system for content creation in AR environment as illustrated in FIG. 6.

Referring now to FIG. 6, a detailed structural block diagram of a handheld device of a system (600) for content creation in AR environment in accordance with yet another embodiment of the present disclosure, is illustrated. The handheld device (610) includes but is not limited to, a stylus, a pen, and the like. The handheld device (610) comprises an input means (615) including, but not limited to, button (615a), click switch (615b), capacitive touch switch (615c), resistive touch switch and piezo touch switch to enable generation of at least one command by an operation thereof to be performed by a content creator. The handheld device (610) further comprises a plurality of sensors (616), including but not limited to, a pressure sensor (616a), a gyro (616b), an accelerometer (616c), a magnetic sensor/magnetometer (616d), earth magnetic field sensor (616e) a proximity sensor (616f), a grip sensor (616g), configured to generate sensor data in response to a movement of the handheld device (610) by the content creator. The handheld device (610) further comprises a processor (611) cooperating with the input means, the sensors and a memory (612). The processor (611) is configured to execute a set of instructions stored in the memory (612) to implement a command generator configured to generate, in response to the operation of the input means performed by the content creator, the at least one command in connection with an object of interest. The processor (611) is further configured to implement a data generator configured to combine the sensor data (514) to generate object data in connection with the object of interest. The processor (611) is further configured to implement a handheld device interface unit configured to transmit the at least one command and the object data. The handheld device (610) further comprises a communication module (613) connected to the processor (611) to transmit the command and object data, through communication modules such as WIFI (613a), BLUETOOTH (613b), near-filed communication (NFC) (613c), and the like.

The handheld device (610) further comprises a vibrator (614) to indicate, typically, the switching ON/OFF of the handheld device (610), a signal processing module (617) cooperating with the processor (611) to process, typically, the signals from the sensors and provide the processed signals back to the processor (611) to enable the processor to generate data. The handheld device (610) further also comprise a battery (618) with a power management module (619) further connected to the processor (611) to supply power to the processor (611) as well as to the input means, sensors, memory, communication module, vibrator and signal processing module of the handheld device (610).

The system (600) further comprises an augmented reality (AR) device (620), wherein the AR device (620) is paired with the handheld device (610). The AR device (620) includes, but is not limited to, wearable AR glasses, head-mounted device, and the like. The AR device (620) comprises a processor (621) cooperating with a memory and configured to execute a set of instructions stored in the memory. The processor (621) is configured to implement an AR device interface unit configured to receive the command and the object data. The AR device interface unit includes a command and data decoder configured to decode the at least one command and the object data. The processor (621) is further configured to implement a context builder module configured to determine a context in relation to the object of interest corresponding to the at least one command and the object data. The processor (621) is further configured to implement a content creator module configured to create a content based on the context and the object data.

The AR device (620) further comprises a display unit (622) configured to display the created content. The AR device (620) further comprises a camera (623) to capture one or more real world objects including the object of interest of the content creator. The AR device (620) further comprises a vibrator (624) to indicate, typically, the switching ON/OFF of the AR device (620).

The AR device (620) further comprises a communication module (625) connected to the processor (621) to receive the command and object data transmitted by the handheld device (610), through communication modules such as WIFI (625*a*), BLUETOOTH (625*b*), near-filed communication (NFC) (625*c*), and the like. An active communication is established between the handheld device (610) and the AR device (620) to pair the handheld device (610) with the AR device (620) and transmit/receive data therebetween. The communication module (625) also comprises USB module (625*d*) to transfer data between the AR device (620) and an external device such as a computer, laptop, mobile, etc. The communication module also comprises a GPS module (625*e*) to detect the geolocation of the object of interest of the content creator.

The AR device (620) further comprises an eye tracking module (626) and focus adjustment module (627) both cooperating with the processor (621) for visual enhancement of the display unit (622). The AR device (620) further comprises an audio module (628) cooperating with the processor (621) to aid the content creator and/or a content recipient.

The AR device (620) further comprises a plurality of sensors (629), including but not limited to, a biometric sensor (629*a*), a gyro (629*b*), an accelerometer (629*c*), a magnetic sensor (629*d*), earth magnetic field sensor (629*e*) a proximity sensor (629*f*), a grip sensor (629*g*), a gesture sensor (629*h*) all cooperating with the processor (621) to provide respective data to aid in content creation and/or content retrieval.

The AR device (620) further comprises a battery (630) with a power management module (631) further connected to the processor (621) to supply power to the processor (621) as well as to the display, camera, vibrator, communication module, eye tracking module, focus adjustment module, audio module, and sensors of the AR device (620).

Figure 8A:
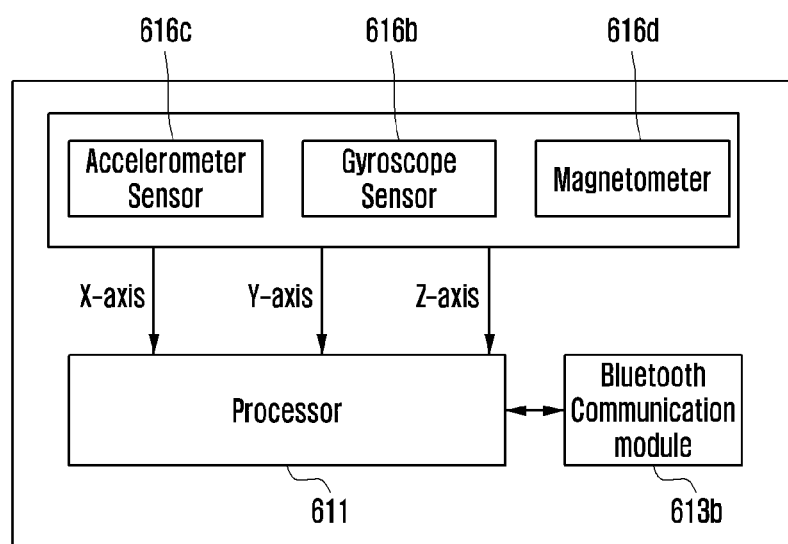
FIG. 8A illustrates a block diagram for gesture/movement recognition employed by the system illustrated in FIGS. 1, 3 and 6-7.

Referring now to FIG. 8A, a block diagram is shown for movement/gesture/maneuver recognition employed by the handheld device (110, 310, 610). The sensors (316, 616) of the handheld devices (110, 310, 610) are, typically, 9-axis MEMS sensor. For example, the gyro (316*b*, 616*b*) is a tri-axial 16-bit gyroscope, the accelerometer (316*c*, 616*c*) is tri-axial 16-bit accelerometer, the magnetometer (616*d*) a tri-axial 13-bit magnetometer. The processor cooperating with the sensors is configured to perform uncertainty reduction of the sensor data using sensor fusion techniques, like Kalman Filter and CNN for precise and accurate tracking of the handheld device (610) in 3D space. The recognized motions are used for generation of data, which along with the commands and current context, decides the next action.

Figure 8B:
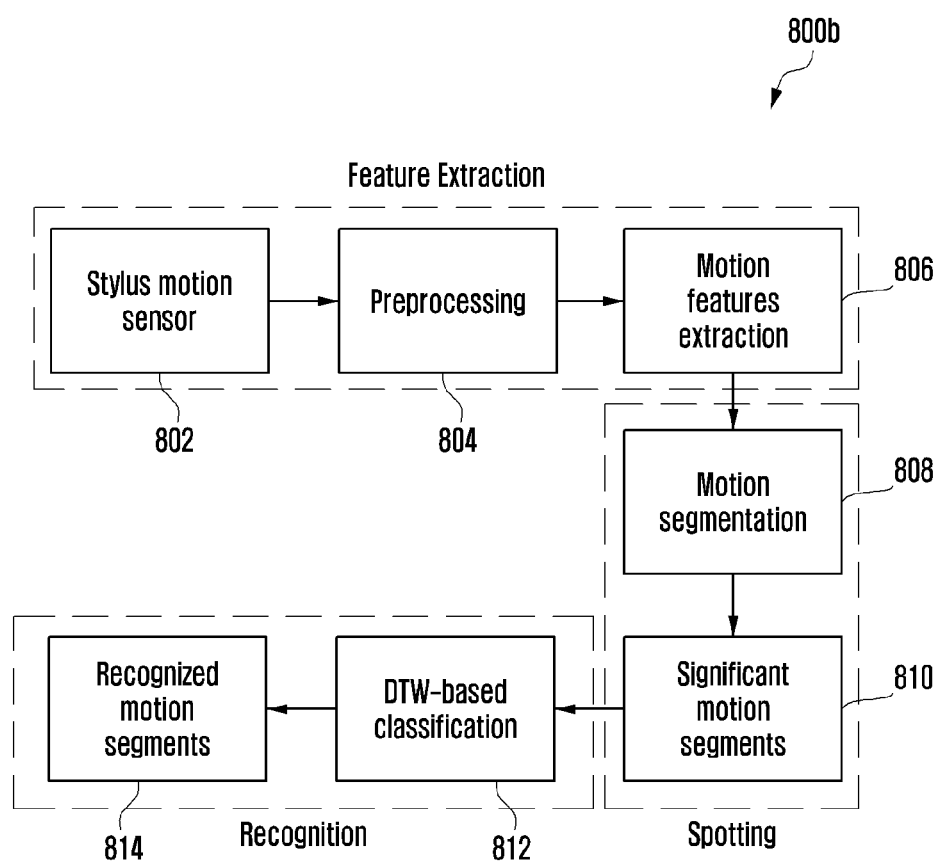
FIG. 8B illustrates a flow diagram for gesture recognition.

Referring to FIG. 8B, a flow diagram for movement/ gesture/maneuver recognition is illustrated. The movement recognition can be divided in three operations, viz. feature extraction which involves extraction of useful data from noise created as a result of the movement/maneuvering of the handheld device (110, 310, 610), spotting which involves finding significant handwriting data from sensors for continuous handheld device motion data, and recognition which involves recognizing complex, similarly shaped letters within a large number of classes and consists of classification and segmentation.

Figure 9:
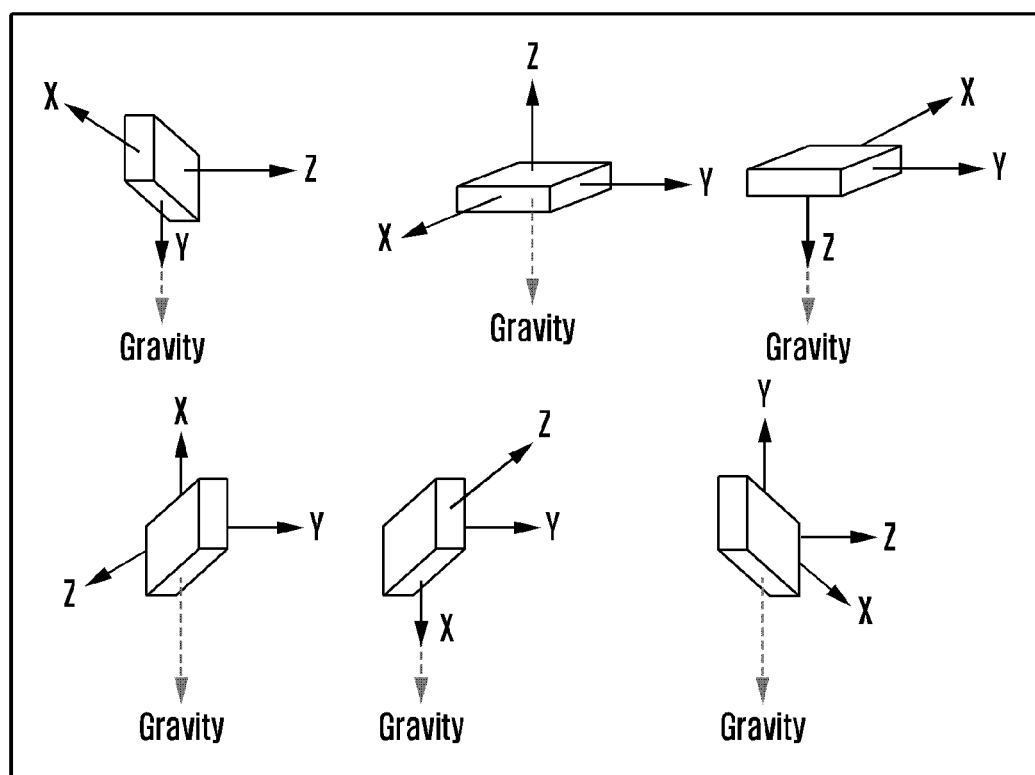
FIG. 9 illustrates techniques for handwriting feature extraction employed by the system for content creation in AR environment as illustrated in FIGS. 1, 3 and 6-7.

Referring to FIG. 9, the feature extraction technique employed by the handheld device (110, 310, 610) as per the flow diagram of FIG. 8B, is shown. Inertial sensor measurements (802) commonly contain noise, sensor drift, cumulative errors, and the influence of gravitation error that produce inaccurate output. Preprocessing operations (804) such as calibration and filters are used to eliminate noise and errors from the inertial signals. The accelerometer (316*c*, 616*c*) data consist of two components' motion induced acceleration and gravity. The gravity component is treated as noise and removed as it does not depend on the user's hand motion. Feature extraction (806) provides values of accelerations ($a_x$, $a_y$, $a_z$), angular velocities ($g_x$, $g_y$, $g_z$) and 3D attitude of the device in quaternion ($q_0$, $q_1$, $q_2$, $q_3$) as feature parameters generated by hand movement for further processing and analysis.

Figure 10:
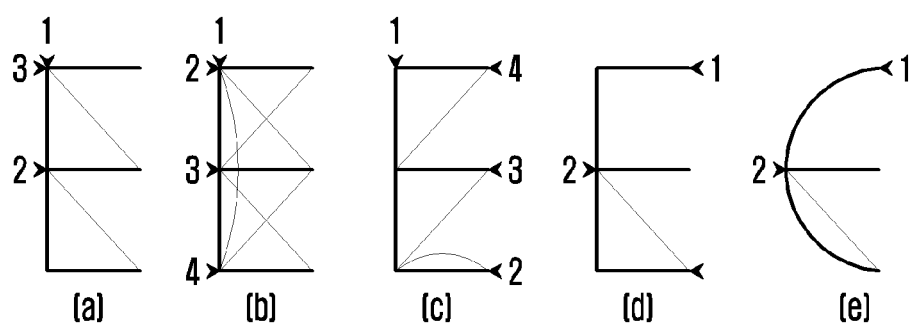
FIG. 10 illustrates techniques for handwriting segmentation employed by the system for content creation in AR environment as illustrated in FIGS. 1, 3 and 6-7.

Referring to FIG. 10, the spotting and handwriting segmentation technique employed by the handheld device (110, 310, 610) as per the flow diagram of FIG. 8B, is shown. Segmentation of continuous hand motion data (808) simplifies the process of handwriting classification in free space. In real-time, the accelerometer (316*c*, 616*c*) and gyroscope (316*b*, 616*b*) data is processed to segment the continuous hand motion data into handwriting motion segments and non-handwriting segments (810). The angular velocity and linear acceleration of a hand motion are two controlling parameters, they provide information to determine the beginning and end boundaries of handwriting segments. The handheld device uses acceleration and temporal thresholds to determine handwriting segmentation for spotting significant motion data, with high accuracy (810).

Figure 11:
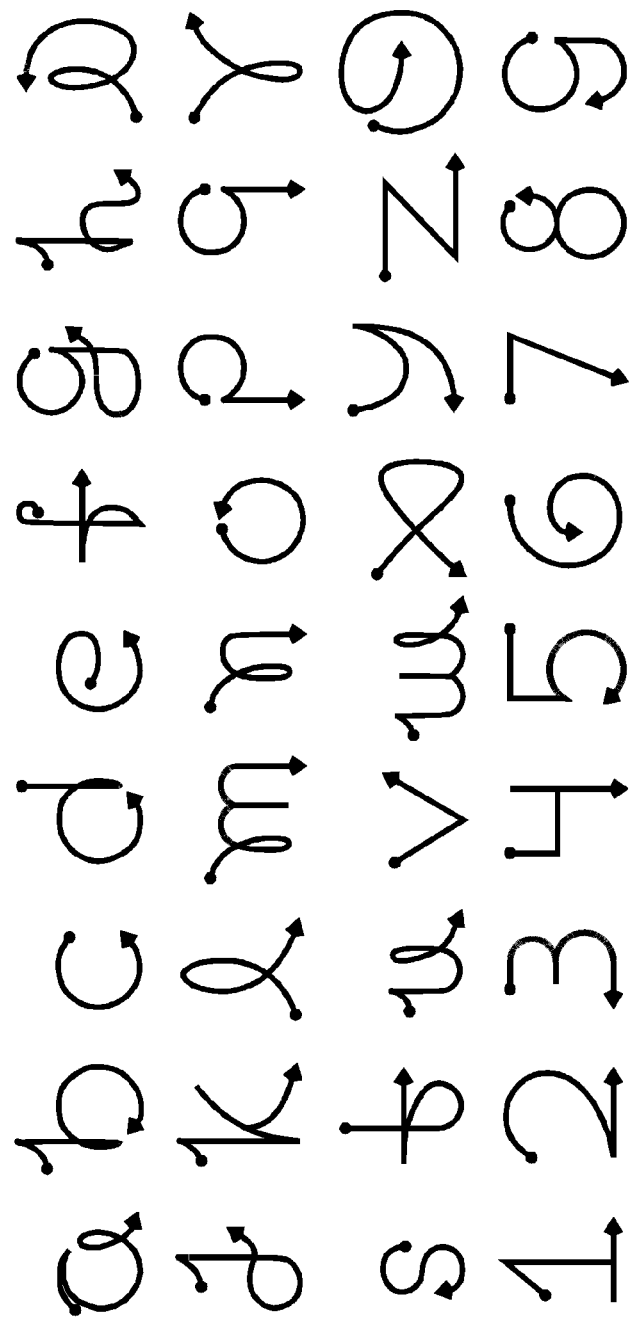
FIG. 11 illustrates techniques for handwriting recognition employed by the system as illustrated in FIGS. 1, 3 and 6-7.

Referring to FIG. 11, the handwriting recognition technique employed by the handheld device (110, 310, 610) as per the flow diagram of FIG. 8B, is shown. The handheld device uses Dynamic Time Warping (DTW) technique which computes the distance between two gesture signals from the data received from the sensors (812). The quaternion output from the motion sensor is transformed into Euler sequences of rotation angles. Roll($\psi$), pitch($\theta$), and yaw($\varphi$), are used in addition to the accelerations ($a_x$, $a_y$, $a_z$) and angular velocities ($g_x$, $g_y$, $g_z$), as feature parameters to efficiently track and classify handwriting in a meaningful and intuitive way. In real-time, the DTW recognition technique computes the similarity between the sensor data and one or more templates. Sensor data is accepted and classified to a class, which has the reduced warping distance and matched the threshold value of that class. The matched value is then obtained from the template(s) and used for performing operations in the AR device (120, 320, 620) for command and data processing (814).

Figure 12B:
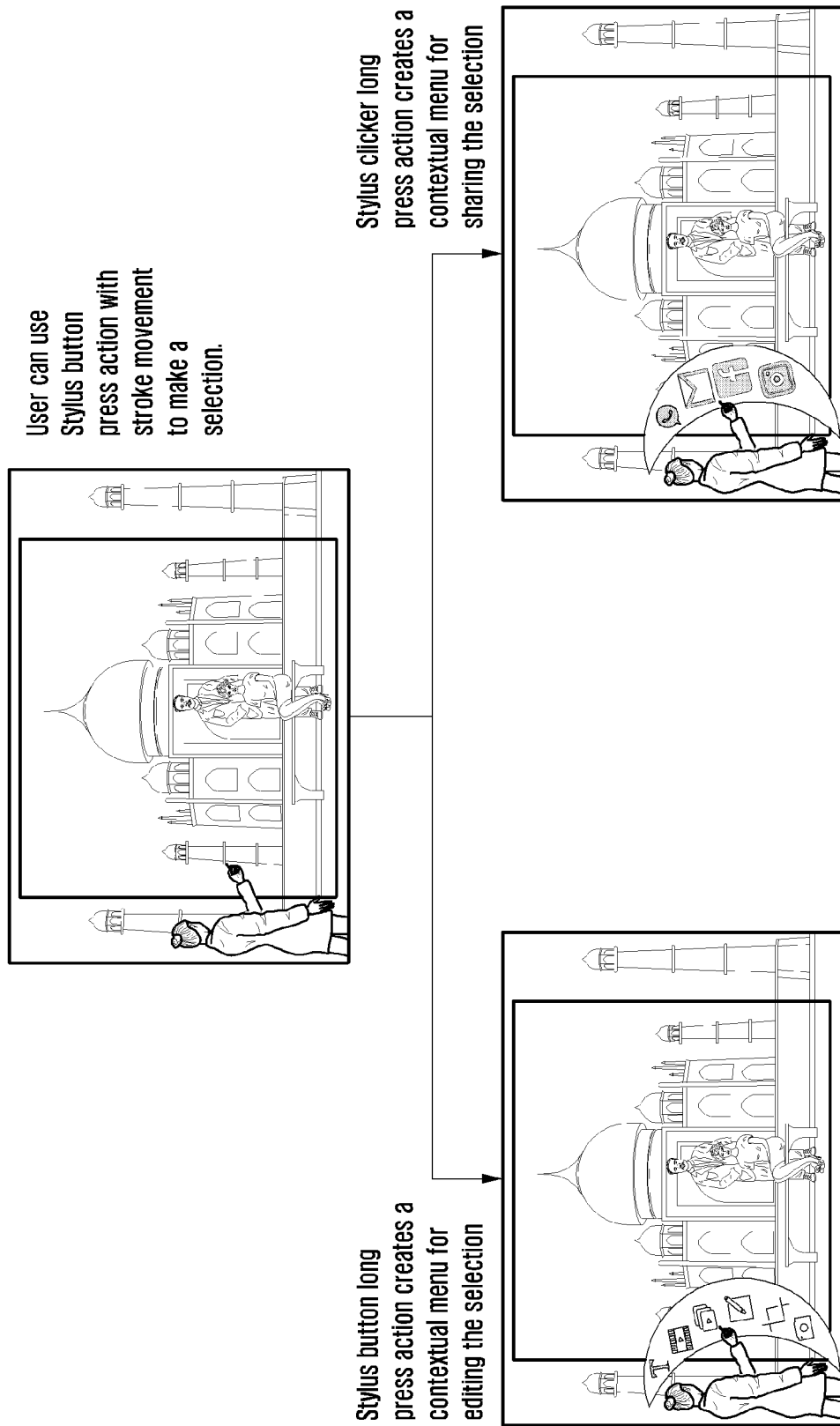

Referring now to FIGS. 12A-12B and 13-16, different implementations of the present disclosure for creating content in AR environment, are illustrated. FIG. 12A illustrates an implementation of the present disclosure for dropping and editing contents in air at a tourist location by using the handheld device and the AR device. As shown in FIG. 12A, content creation is initiated through the clicker of handheld device/stylus/pen. The handheld device/stylus/pen button press creates a callout menu which can be used to drop an air message. A user/content creator can use handheld device stroke data generated by the sensors upon stroking/maneuvering of the handheld device to write message in the callout. The handheld device clicker long press creates a contextual menu for sharing and storing menu. FIG. 12B illustrates an implementation of the present disclosure for editing and sharing edited content by using the handheld device and the AR device. As shown in FIG. 12B, the user/content creator can use the handheld device/stylus/pen button press action with stroke movement to make a selection. The handheld device button long press action then creates a contextual menu for editing the selection. Thereafter, the handheld device clicker long press action creates a contextual menu for sharing the selection, FIG. 13 illustrates an implementation of the present disclosure for selecting, gathering and creating content from real world objects for sharing the content. As shown in FIG. 13, a content creator initiates content creation with handheld device/stylus/pen click. The content creator then makes a selection using the handheld device/stylus/pen button press action with stroke movement. The handheld device long button presses action results in processing the selected content, gathering additional information and generating contextual menu. Thereafter, the content creator selects an option from the menu and provides handheld device stroke data for creating content along with pick and drop relevant information.

Figure 14:
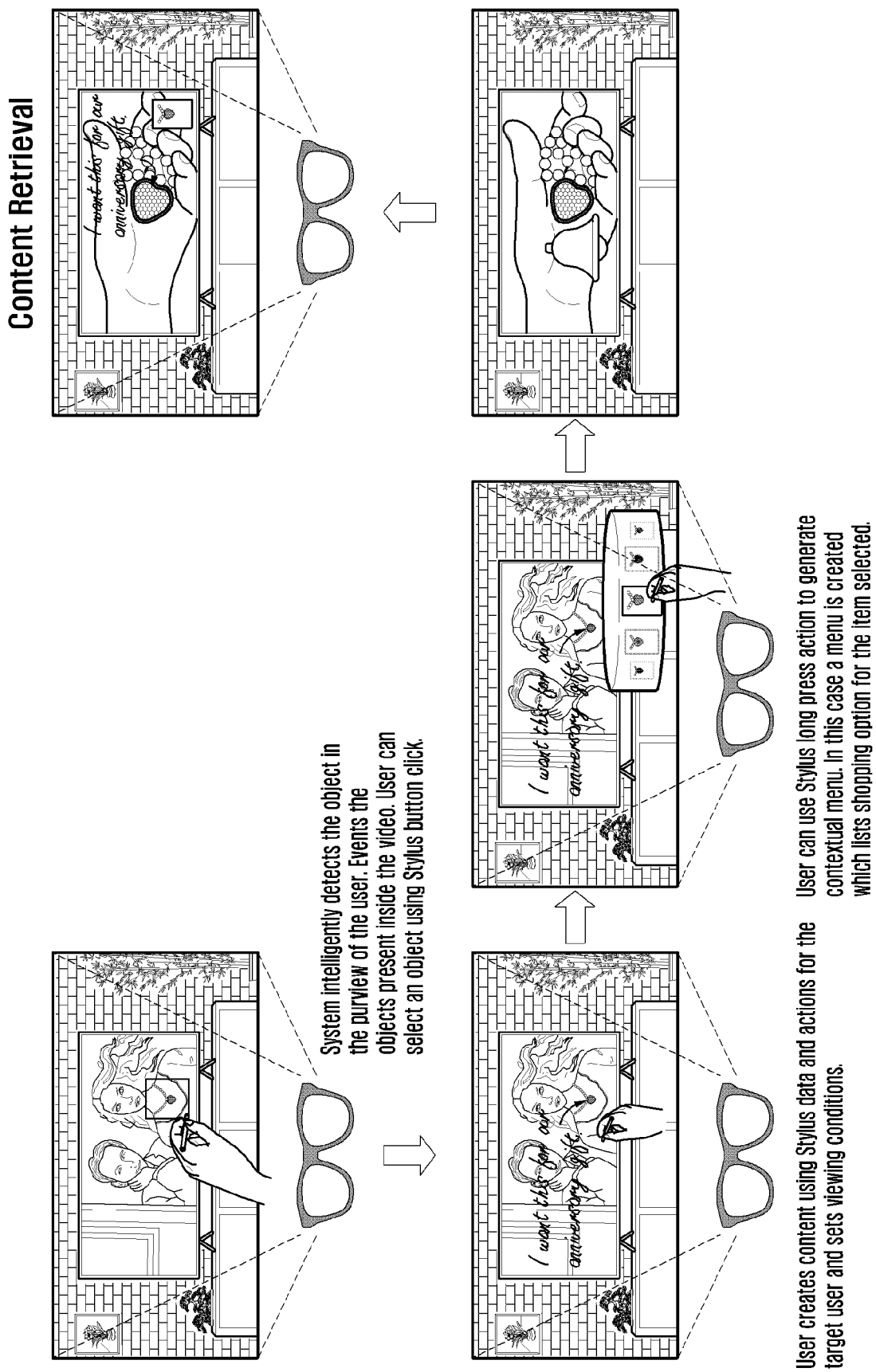

FIG. 14 illustrates an implementation of the present disclosure for creating content from live stream video or images and retrieving the same. As shown in FIG. 14, the AR device worn by a content creator intelligently detects the object in the purview of the content creator, and events the objects present inside the video. The content creator can then select an object using the handheld device/stylus/pen button click. The content creator then creates content using handheld device data and actions for the target user and sets viewing conditions. Thereafter, the content creator can use handheld device long press action to generate contextual menu. In this case a menu is created which lists shopping option for the item selected.

Figure 15:
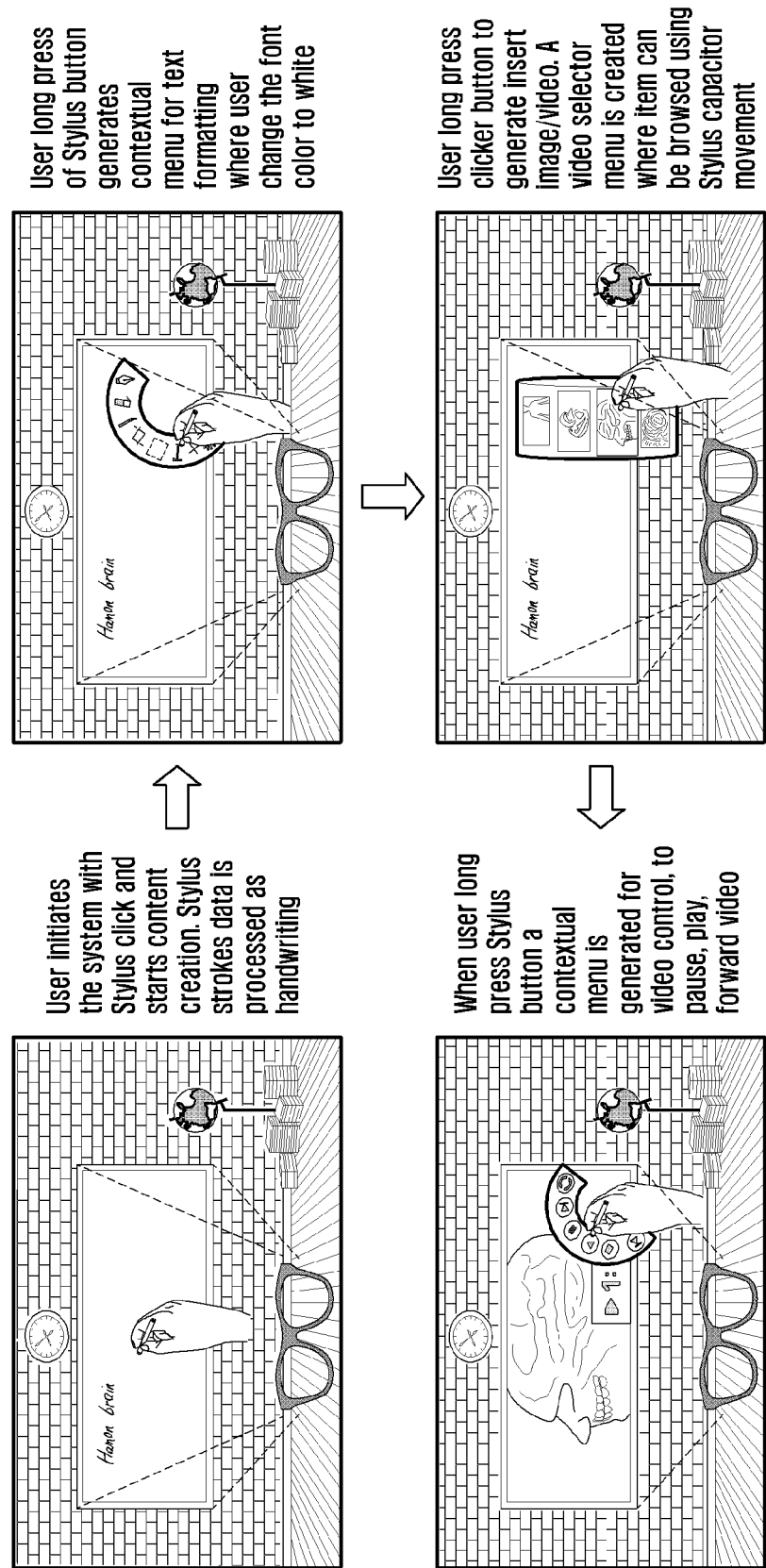

FIG. 15 illustrates an implementation of the present disclosure as a smart classroom with interactive and editable AR contents. As shown in FIG. 15, a content creator initiates the content creation with handheld device/stylus/pen click. The handheld device stokes/movement/manoeuvring data is processed as handwriting. The long press of handheld device button generates contextual menu for text formatting where the content creator can change the font color to white. The content creator long presses the clicker button to generate insert image/video. A video selector menu is created where item can be browsed using handheld device capacitive touch sensor. When the content creator long presses the handheld device button a contextual menu is generated for video control, to pause, play, forward video.

FIG. 16 illustrates an implementation of the present disclosure for multilevel book marking and AR notes creation and retrieval. As shown in FIG. 16, a content creator can use the handheld device/stylus/pen button press action with stroke movement to highlight the selection, whereupon a text formatting menu is generated to add additional styling. The content creator can use handheld device/stylus/pen button long press action with movement. The AR device detects the shape drawn by the user and a user note is added. The content creator can create content of various level for display such as high-lighted text, notes etc. The content creator can use the handheld device clicker press action to save and share content. Sharing menu provides customization for the level of sharing to each content recipient. For example, only highlighted content is shared with content recipient #1, and full content is shared with content recipient #2.

At least some of the technical advantages offered the system and method for content creation in AR environment according to the present disclosure includes:

creating and sharing, context aware, customized, handwritten, invisible and secure AR messages in 3D space;

creating smart and intelligent AR contents using multiple contextual menus and action list; and enabling the system to be used as a remote for camera, presentation, and the like.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for creating content in a second electronic device, the method comprising:
    establishing a communication link with a first electronic device;
    receiving a command and data related to an object from the first electronic device, wherein the command is a selection of the object among a plurality of objects located a real world within a field of view of the second electronic device;
    recognizing the object located in the real world within the field of view of the second electronic device based on the received command and data;
    determining a context related to the recognized object;
    creating an augmented reality (AR) content based on the determined context and the received data; and
    rendering the created AR content for display in an AR display of the second electronic device.

2. The method of claim 1, further comprising:
    locking the object to establish a session.

3. The method of claim 2, wherein locking the object includes:
    locking the object upon receiving the command and data related to the object from the first electronic device.

4. The method of claim 1, wherein determining the context includes:
    capturing at least one parameter selected from a global context, a local context, and one or more other objects located in the real world within the field of view of the second electronic device when recognizing the object;
    identifying a profile of a content creator;
    identifying the context of the object based on a combination of the command, the data, the at least one captured parameter and the identified profile of the content creator;
    rendering an action list and a menu for creating the content based on the identified context;
    analyzing the rendered action list and the menu; and
    building the context based on the analyzed rendered action list, menu and the identified context.

5. The method of claim 4, wherein:
    the global context includes data belonging to the content creator stored on a server, and
    the local context is selected from one or more of date and time of recognizing the object, geolocation of the object and physical conditions of the object.

6. The method of claim 4, wherein creating the content includes:
    generating a subsequent context-aware action list and a subsequent context-aware menu, based on the built context and the data; and rendering the subsequent context-aware action-list and the subsequent context-aware menu for creating the content.

7. The method of claim 1, wherein the data is generated based on movement of the first electronic device in three-dimensional (3D) space relative to the object.

8. The method of claim 1, further comprising:
authenticating a content recipient;
authenticating at least one condition set by a content creator for delivery of a content created by the content creator;
notifying, by the second electronic device to the content recipient, creation of the content by the content creator upon successful authentication of the at least one condition;
retrieving the created content; and
rendering, for the content recipient, the created content.

9. The method of claim 8, wherein the at least one condition includes at least one of location of the object, physical conditions of the object, or confirming a presence of other real world objects in a vicinity of the object.

10. The method of claim 1, wherein:
the first electronic device includes a stylus or a pen.

11. A second electronic device comprising:
a display;
a communication module; and
a processor configured to be operatively connected to the display and the communication module,
wherein the processor is configured to:
establish a communication link with a first electronic device via the communication module;
receive a command and data related to an object from the first electronic device via the communication module, wherein the command is a selection of the object among a plurality of objects located in a real world within a field of view of the second electronic device;
recognize the object located in the real world within field of view of the second electronic device based on the received command and data;
determine a context related to the recognized object;
create an augmented reality (AR) content based on the determined context and the data; and
render the created AR content for display on the display.

12. The second electronic device of claim 11, wherein the processor is further configured to:
lock the object to establish a session.

13. The second electronic device of claim 12, wherein to lock the object to establish the session, the processor is further configured to:
lock the object upon receiving the command and data related to the object from the first electronic device.

14. The second electronic device of claim 11, wherein the processor is further configured to:
capture at least one parameter selected from a global context, a local context, and one or more other objects located in the real world within the field of view of the second electronic device when recognizing the object;
identify a profile of a content creator;
identify the context of the object based on a combination of the command, the data, the at least one captured parameter and the identified profile of the content creator;
render an action list and a menu for creating the content based on the identified context;
analyze the rendered action list and the menu; and
build the context based on the analyzed rendered action list, menu and the identified context.

15. The second electronic device of claim 14, wherein:
the global context includes data belonging to the content creator stored on a server, and
the local context is selected from one or more of, date and time of recognizing the object, geolocation of the object and physical conditions of the object.

16. The second electronic device of claim 14, wherein the processor is further configured to:
generate a subsequent context-aware action list and a subsequent context-aware menu, based on the built context and the data; and
render the subsequent context-aware action-list and the subsequent context-aware menu for creating the content.

17. The second electronic device of claim 11, wherein the data is generated based on movement of the first electronic device in three-dimensional (3D) space relative to the object.

18. The second electronic device of claim 11, wherein the processor is further configured to:
authenticate a content recipient;
authenticate at least one condition set by a content creator for delivery of a content created by the content creator;
notify, by the second electronic device to the content recipient, creation of the content by the content creator upon successful authentication of the at least one condition;
retrieve the created content; and
render, for the content recipient, the created content.

19. The second electronic device of claim 18, wherein the at least one condition includes at least one of location of the object, physical conditions of the object, or confirming a presence of other real world objects in a vicinity of the object.

20. The second electronic device of claim 11, wherein:
the first electronic device includes a stylus or a pen.

\* \* \* \* \*